United States Patent
Lee et al.

(10) Patent No.: US 12,242,878 B2
(45) Date of Patent: Mar. 4, 2025

(54) VIRTUALIZED SYSTEM AND METHOD OF PREVENTING MEMORY CRASH OF SAME

(71) Applicant: SAMSUNG ELECTRONICS CO., LTD., Suwon-si (KR)

(72) Inventors: Onegun Lee, Suwon-si (KR); Jihoon Lee, Suwon-si (KR); Jun Kim, Seoul (KR); Ilho Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 17/687,839

(22) Filed: Mar. 7, 2022

(65) Prior Publication Data
US 2022/0374254 A1  Nov. 24, 2022

(30) Foreign Application Priority Data
May 20, 2021  (KR) .......... 10-2021-0064861

(51) Int. Cl.
*G06F 9/455* (2018.01)
*G06F 12/02* (2006.01)
(Continued)

(52) U.S. Cl.
CPC ...... *G06F 9/45558* (2013.01); *G06F 9/45545* (2013.01); *G06F 12/0238* (2013.01); *G06F 12/0871* (2013.01); *G06F 12/1081* (2013.01); *G06F 13/1668* (2013.01); *G06F 2009/45583* (2013.01)

(58) Field of Classification Search
CPC .................................. G06F 9/45558
See application file for complete search history.

(56) References Cited

U.S. PATENT DOCUMENTS

| 7,020,738 | B2 | 3/2006 | Neiger et al. |
| 7,278,030 | B1 | 10/2007 | Chen et al. |

(Continued)

OTHER PUBLICATIONS

Anonymous, "Input-output memory management unit", Wikipedia, Feb. 16, 2021, XP055950497, Retrieved from the Internet: URL:https://en.Wikipedia.org/w/index.php?title=Input-output_memory_management_unit&oldid=1007143938. (4 pages total).

(Continued)

*Primary Examiner* — Charlie Sun
(74) *Attorney, Agent, or Firm* — Sughrue Mion, PLLC

(57) ABSTRACT

A virtualized system is provided. The virtualized system includes: a memory device; a processor configured to provide a virtualization environment; a direct memory access device configured to perform a function of direct memory access to the memory device; and a memory management circuit configured to manage a core access of the processor to the memory device and a direct access of the direct memory access device to the memory device. The processor is further configured to provide: a plurality of guest operating systems that run independently from each other on a plurality of virtual machines of the virtualization environment; and a hypervisor configured to control the plurality of virtual machines in the virtualization environment and control the memory management circuit to block the direct access when a target guest operating system controlling the direct memory access device, among the plurality of guest operating systems is rebooted.

20 Claims, 18 Drawing Sheets

(51) Int. Cl.
    *G06F 12/0871*     (2016.01)
    *G06F 12/1081*     (2016.01)
    *G06F 13/16*     (2006.01)

(56) References Cited

U.S. PATENT DOCUMENTS

| | | |
|---|---|---|
| 8,527,673 B2 | 9/2013 | Mahalingam et al. |
| 9,183,093 B2 | 11/2015 | Antony |
| 9,311,458 B2 * | 4/2016 | Mangalampalli ....... G06F 13/28 |
| 9,450,885 B2 | 9/2016 | Johnsen et al. |
| 9,875,128 B2 | 1/2018 | Tsirkin et al. |
| 10,180,854 B2 | 1/2019 | Leslie-Hurd et al. |
| 10,713,081 B2 * | 7/2020 | Tsirkin .................... G06F 21/53 |
| 2012/0072619 A1 | 3/2012 | Tsirkin et al. |
| 2016/0077981 A1 | 3/2016 | Kegel |

OTHER PUBLICATIONS

Communication issued Aug. 19, 2022 by the European Patent Office in counterpart European Patent Application No. 22160435.8.

* cited by examiner

VIRTUALIZED SYSTEM AND METHOD OF PREVENTING MEMORY CRASH OF SAME

CROSS-REFERENCE TO RELATED APPLICATION

This application claims priority to Korean Patent Application No. 10-2021-0064861, filed on May 20, 2021, in the Korean Intellectual Property Office, the disclosure of which is incorporated by reference herein in its entirety.

BACKGROUND

1. Technical Field

Methods, apparatuses and systems consistent with example embodiments relate generally to semiconductor integrated circuits, and more particularly to a virtualized system and a method of preventing memory crash of a virtualized system.

2. Related Art

Virtualization indicates a technology such that various operating systems may run on one physical device by representing hardware of a physical device as virtualized hardware. Different operating systems may run independently from each other in a virtualization environment provided by a processor to which a virtualization is applied. The virtualization may provide merits such as isolation, high availability, workload balancing, sandboxing, etc.

Intellectual properties (IPs) (i.e., functional circuitries or blocks) having various functions may be included in, or implemented by, a virtualized system. Some IPs are able to perform a function of direct access to a memory device, and an IP having the function of direct access may be referred to as a direct memory access device. The direct memory access device may transfer data to and/or from a memory device without passing through a processor (e.g., a central processing unit (CPU)), but may also cause problems which result in a memory crash.

SUMMARY

Some example embodiments may provide virtualized systems and associated methods capable of efficiently preventing memory crash.

According to example embodiments, a virtualized system includes a memory device; a processor configured to provide a virtualization environment; a direct memory access device configured to perform a function of direct memory access to the memory device; and a memory management circuit configured to manage a core access of the processor to the memory device and a direct access of the direct memory access device to the memory device. The processor is further configured to provide: a plurality of guest operating systems that run independently from each other on a plurality of virtual machines of the virtualization environment; and a hypervisor configured to control the plurality of virtual machines in the virtualization environment and control the memory management circuit to block the direct access when a target guest operating system controlling the direct memory access device, among the plurality of guest operating systems is rebooted.

According to example embodiments, a method of preventing memory crash of a virtualized system, includes: monitoring a plurality of guest operating systems; rebooting a target guest operating system controlling a direct memory access device, among the plurality of guest operating systems, based on a monitoring result of the monitoring; controlling a hypervisor to provide control signals when the target guest operating system is rebooted; and controlling a memory management circuit to block the direct memory access device from directly accessing a memory device based on the control signals.

According to example embodiments, a virtualized system includes: a memory device; a processor configured to provide a virtualization environment; a direct memory access device configured to perform a function of direct memory access to the memory device; and a memory management circuit including a core memory management unit and a direct memory management unit, wherein the core memory management unit is configured to manage a core access of the processor to the memory device and the direct memory management unit is configured to manage a direct access of the direct memory access device to the memory device. The processor is further configured to provide: a plurality of guest operating systems that run independently from each other on a plurality of virtual machines of the virtualization environment; and a hypervisor configured to control the plurality of virtual machines in the virtualization environment. Each of the core memory management unit and the direct memory management unit is configured to perform a first stage address translation to convert a virtual address of the plurality of guest operating systems to an intermediate physical address and a second stage address translation to convert the intermediate physical address to a physical address of the memory device, and the hypervisor is configured to control the memory management circuit to block the second stage address translation of the direct memory management unit when a target guest operating system controlling the direct memory access device among the plurality of guest operating systems is rebooted.

The virtualized system and the method of preventing memory crash of the virtualized system according to example embodiments may rapidly block direct access and efficiently prevent memory crash by controlling the memory management circuit to provide temporal isolation when the target guest operating system controlling the direct memory access device is rebooted.

BRIEF DESCRIPTION OF THE DRAWINGS

The above and other aspects, features, and advantages will be more clearly understood from the following description taken in conjunction with the accompanying drawings.

DETAILED DESCRIPTION

Figure 1:
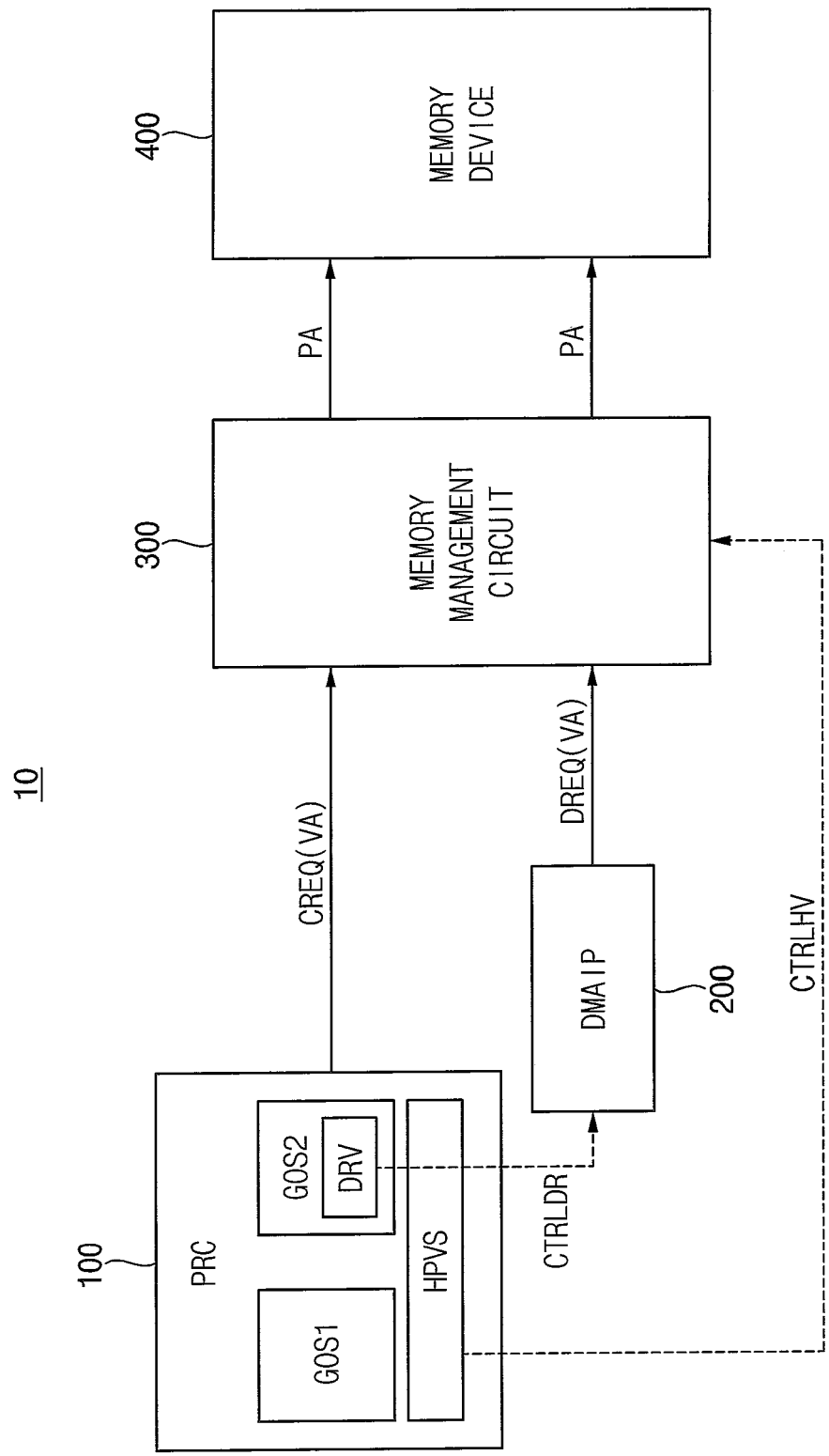
FIG. 1 is a block diagram illustrating a virtualized system according to example embodiments.

Various example embodiments will be described more fully hereinafter with reference to the accompanying drawings. In the drawings, like numerals refer to like elements throughout. The repeated descriptions may be omitted.

Figure 2:
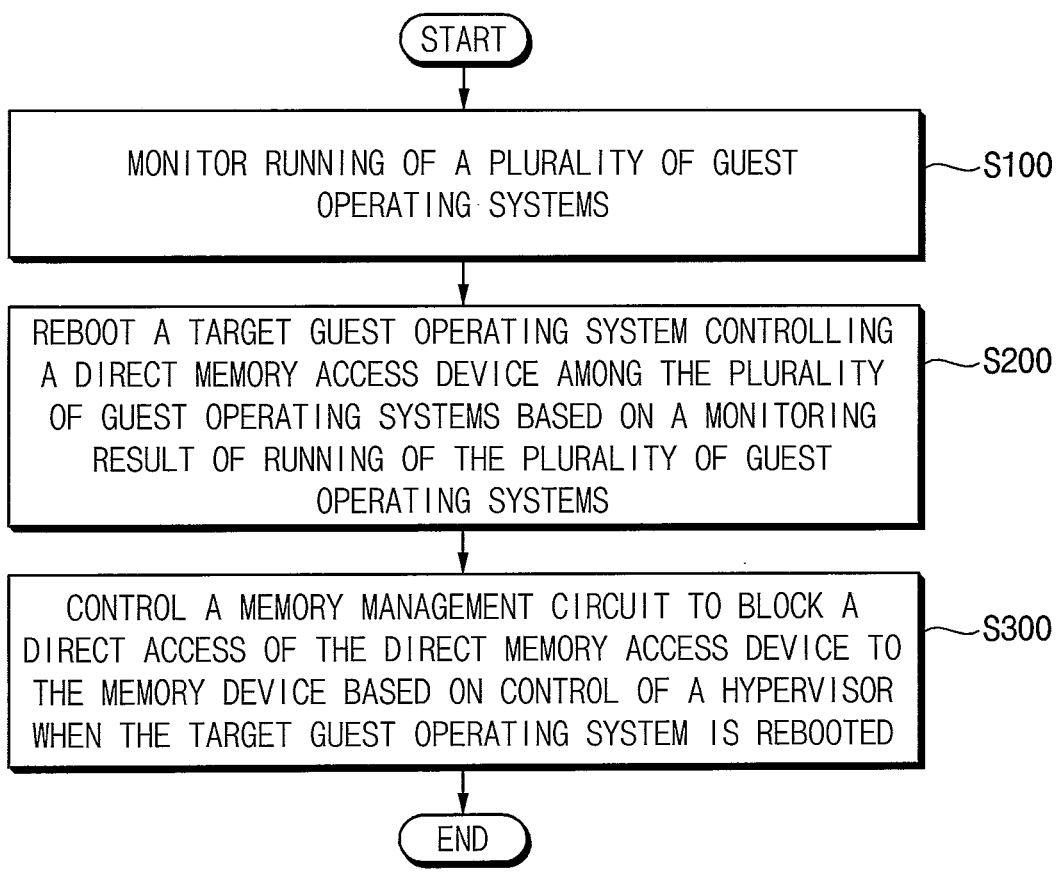
FIG. 2 is a flowchart illustrating a method of preventing memory crash of a virtualized system according to example embodiments.

FIG. 1 is a block diagram illustrating a virtualized system according to example embodiments, and FIG. 2 is a flowchart illustrating a method of preventing memory crash of a virtualized system according to example embodiments.

Referring to FIG. 1, a virtualized system 10 may include a processor PRC 100 (e.g., a CPU), a direct memory access device DMAIP 200, a memory management circuit 300 and a memory device 400.

The memory device 400 may store data and program codes. Software program codes such as a hypervisor HPVS, guest operating systems GOS1 and GOS2, etc., may be loaded in the memory device 400 and the loaded software program codes may be executed by the processor 100.

For example, while the virtualized system 10 is booted up, the software program codes stored in a nonvolatile memory device may be loaded in the memory device 400 according to a booting sequence, and the processor 100 may provide a virtualization environment based on the loaded software program codes. As such, the memory device 400 may function as a working memory of the virtualized system 10.

The memory device 400 may be implemented with a volatile memory such as a dynamic random access memory (DRAM), a static random access memory (SRAM), etc., but example embodiments are not limited thereto. The memory device 400 may be implemented with another type of volatile memory or a nonvolatile memory.

The direct memory access device 200 may be able to perform a function of direct memory access to the memory device 400. For example, the direct memory access device 200 may be a camera, a graphics processing unit (GPU), a neural processing unit (NPU), a peripheral component interconnect express (PCIe) device, a universal flash storage (UFS) device, etc. FIG. 1 illustrates one direct memory access device for convenience of illustration and description, and example embodiments are not limited thereto. A virtualized system may include a plurality of intellectual properties (i.e., virtualized circuits) having various functions, and two or more intellectual properties may be able to perform the function of direct memory access.

The direct memory access indicates a scheme to transfer data directly from one memory device to another memory device or directly between a memory device and an input-output device without passing through the processor 100, which may be supported by an internal bus of the virtualized system 10.

Modes of the direct memory access may include a burst mode in which the direct memory access device 200 steals control of the internal bus from the processor 100 to transfer data all at once, a cycle steal mode in which the direct memory access device 200 accesses the memory device 400 while the processor 100 does not access the memory device 400. The direct memory access is performed without intervention of the processor 100. Accordingly performance of the virtualized system 10 may be enhanced because the processor 100 may operate while the direct memory access is performed.

The memory management circuit 300 may manage a core access of the processor 100 to the memory device 400 and a direct access of the direct memory access device 200 to the memory device 400. The core access and the direct access may include a read operation to read data from the memory device 400 and a write operation to store data to the memory device 400. The core access may be performed based on a core access request CREQ issued by the processor 100, and the direct access may be performed based on a direct access request DREQ issued by the direct memory access device 200.

Each of the core access request CREQ and the direct access request DREQ may include a virtual address VA for the read operation or the write operation. The memory management circuit 300 may perform address translation to provide a physical address PA mapped to the virtual address VA. The virtual address VA indicates a position in a virtual address space of the guest operating systems GOS1 and GOS2, and the physical address PA indicates a real physical position of a memory region of the memory device 400. Example embodiments of the address translation will be described below with reference to FIGS. 7 and 8.

The processor 100 may provide a virtualization environment, and the hypervisor HPVS, and a plurality of guest operating systems GOS1 and GOS2 may run on the virtualization environment under control of the hypervisor HPVS. FIG. 1 illustrates two guest operating systems, that is, a first guest operating system GOS1 and a second guest operating system GOS2 for convenience of illustration and description, and example embodiments are not limited thereto. The number of the guest operating systems controlled by the hypervisor HPVS may be determined variously according to the virtualization environment.

FIG. 1 illustrates that the hypervisor HPVS and the plurality of guest operating systems GOS1 and GOS2 are included in the processor 100 for convenience of illustration. As described above, the hypervisor HPVS and the plurality of guest operating systems GOS1 and GOS2 may be loaded in the memory device 400 as the software program codes and may be executed by the processor 100.

The plurality of guest operating systems GOS1 and GOS2 may run independently from each other on a plurality of virtual machines of the virtualization environment, and the hypervisor HPVS may control the plurality of virtual machines in the virtualization environment. The virtualization environment will be described below with reference to FIG. 3.

Referring to FIGS. 1 and 2, the virtualized system 10 may monitor running of the plurality of guest operating systems GOS1 and GOS2 (S100). The virtualized system 10 may reboot a target guest operating system controlling a direct memory access device 200, among the plurality of guest operating systems GOS1 and GOS2, based on a monitoring result of running of the plurality of guest operating systems GOS1 and GOS2 (S200).

The virtualized system 10 may control the memory management circuit 300 to block the direct access of the direct memory access device 200 to the memory device 400 based on control of the hypervisor HPVS when the target guest operating system is rebooted (S300).

FIG. 1 illustrates an example in which the second guest operating system GOS2 corresponds to the target guest operating system. The second guest operating system GOS2 may include a device driver DRV and the second guest operating system GOS2 may control the direct memory access device 200 through the device driver DRV. The device driver DRV may generate control signals CTRLDR to control the direct memory access device 200. In this case, the hypervisor HPVS may control the memory management circuit 300 to block the direct access of the direct memory access device 200 to the memory device 300 when the second guest operating system GOS2 corresponding to the target guest operating system is rebooted. The hypervisor HPVS may generate control signals CTRLHV to control the memory management circuit 300.

In general, an entire system is powered off and then powered on again when the operating system is rebooted in a non-virtualization environment. During the rebooting sequence, the direct memory access devices operating with the processor stop operations and are reset into a hardware initialization state.

In contrast, in the virtualization environment, the entire system must be able to maintain operation such that even though one guest operating system is rebooted, the remaining guest operating systems may run continuously. The intellectual properties operating with the processor have to perform operations instructed by the processor or external devices until the software operations stop or the initialization process is performed.

Among the intellectual properties, the direct memory access device 200 is able to issue transactions or perform the direct access request for accessing the memory device 400 even though the target guest operating system GOS2 which controls the direct memory access device 200 is rebooted. Such memory access may overwrite the memory region of the other guest operating system or read wrong data, thereby causing operation errors of the virtualized system 10. Those problems may occur in all of the virtualization environments of the virtualized system including a direct memory access device when a sudden reset of the target guest operating system controlling the direct memory access device is triggered. In this disclosure, the sudden reset of the target guest operating system indicates that the target guest operating system is rebooted before the direct memory access device completes the operations.

According to example embodiments, the hypervisor HPVS may control the memory management circuit 300 to block the direct access of the direct memory access device 200 to the memory device 400 when the target guest operating system controlling the direct memory access device 200 is rebooted.

In some example embodiments, the memory management circuit 300 may block the direct access by blocking direct address translation based on control of the hypervisor HPVS when the target guest operating system is rebooted, where the direct address translation is to convert the virtual address VA of the direct access request DREQ issued by the direct memory access device 200 to the physical address PA of the memory device 400. In contrast, the memory management circuit 300 may continue to perform a core address translation to provide the core access regardless of the status of the target guest operating system, where the core address translation is to convert the virtual address VA of the core access request CREQ issued by the processor 100 to the physical address PA of the memory device 400.

In some example embodiments, the memory management circuit 300 may block the direct access by invalidating mapping entries related to the target guest operating system among mapping entries of a translation table based on control of the hypervisor HPVS when the target guest operating system is rebooted. The invalidation of the mapping entries will be described below with reference to FIG. 15.

As such, the virtualized system 10 and the method of preventing memory crash of the virtualized system 10 according to example embodiments may rapidly block the direct access and efficiently prevent the memory crash by controlling the memory management circuit 300 to provide temporal isolation of the direct memory access device DMAIP when the target guest operating system controlling the direct memory access device 200 is rebooted.

Figure 3:
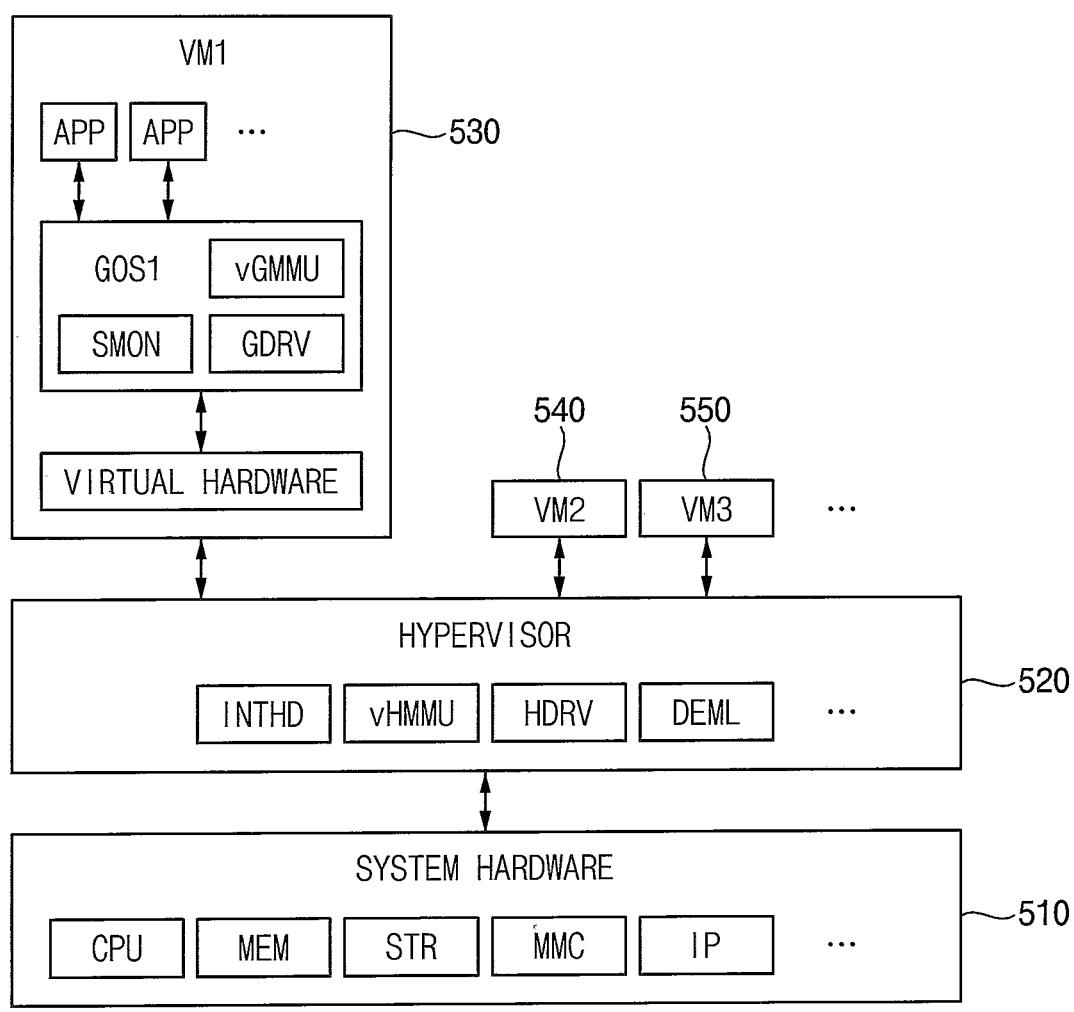
FIG. 3 is a block diagram illustrating a virtualized system according to example embodiments.

FIG. 3 is a block diagram illustrating a virtualized system according to example embodiments.

Referring to FIG. 3, a virtualized system 500 may include system hardware 510 and software runs on a virtualization environment provided by the system hardware 510. The software may include a hypervisor 520 and a plurality of virtual machines VM1 530, VM2 540 and VM3 550. FIG. 3 illustrates the three virtual machines 530, 540 and 550 for convenience of illustration, and the number of virtual machines installed on the hypervisor 520 may be determined variously.

The system hardware 510 may include a central processing unit CPU, a memory device MEM, a storage device STR, a memory management circuit MMC, one or more intellectual properties IPs. The central processing unit CPU may be a single processor or include a plurality of processor cores. When the central processing unit CPU include a plurality of processor cores, one of the processor cores may correspond to the processor 100 in FIG. 1 that provides the virtualization environment.

The virtual machines 530, 540 and 550 may have various configurations to perform respective functions. Hereinafter, one virtual machine 530 is described as an example. As illustrated in FIG. 3, the virtual machine 530 may include a virtual hardware, a guest operating system GOS1 and applications APPs.

The virtual hardware may correspond to physical components that are emulated as software in the virtual machine 530. In other words, corresponding physical components of the virtualized system 500 may be virtualized as virtual hardware. The virtual hardware may include virtual components emulating the physical components allocated to the virtual machine 530 among the entire physical components in the system hardware 510. For example, the virtual hardware may include a virtual processor emulating the central processing unit CPU, a virtual memory device emulating the memory device MEM, a virtual IP emulating the IP, etc.

For example, the guest operating system GOS1 may include a virtual memory management unit vGMMU, a device driver GDRV, a state monitor SMON, etc.

The virtual memory management unit vGMMU may allocate a virtual address space of the guest operating system GOS1 to the applications APPs running on the guest operating system GOS1. The virtual memory management unit vGMMU may manage mapping between a virtual address in the virtual address space and an intermediate physical address of the virtual memory device included in the virtual hardware.

The device driver GDRV may control the IP included in the system hardware 510 via the virtual IP included in the virtual hardware.

The state monitor SMON may provide state information by monitoring the virtual machine 530 and/or the guest operating system GOS1. For example, the state monitor SMON may provide the state information periodically while the virtual machine 530 operates normally. In this case, the hypervisor 520 may determine to reboot the guest operating system GOS1 when the state information is not provided for a predetermined time interval.

The hypervisor 520 may generate, schedule and manage the plurality of virtual machines 530, 540 and 550. The hypervisor 520 may provide interface between the plurality of virtual machines 530, 540 and 550 and the system hardware 510, and manage execution of instructions and data transfer associated with the plurality of virtual machines 530, 540 and 550. The hypervisor 520 may be referred to as a virtual machine monitor or a virtual machine manager.

For example, the hypervisor 520 may include an interrupt handler INTHD, a virtual memory management unit vHMMU, a device driver HDRV, a device emulator DEML, etc.

The virtual memory management unit vHMMU may allocate a plurality of guest memory regions of the memory device 400 to the plurality of virtual machines 530, 540 and 550 or the plurality of guest operating systems. The virtual memory management unit vHMMU may manage mapping between the intermediate physical address of the virtual memory devices in the plurality of virtual machines 530, 540 and 550 and the physical address of the memory device MEM.

The device driver HDRV may directly control the IP included in the system hardware 510. Each IP in the system hardware 510 may be controlled by the device driver GDRV included in the guest operating system GOS1 and/or the device driver HDRV included in the hypervisor 520.

The interrupt handler INTHD may control abnormal operations of the virtualized system 500 based on information from the virtual machines 530, 540 and 550 and/or information from the system hardware 510. For example, the interrupt handler INTHD may determine rebooting of guest operating systems respectively included in the virtual machines 530, 540 and 550.

The device emulator DEML may allocate the physical components respectively to the virtual machines 530, 540 and 550, and establish and manage the virtual hardware by emulating the allocated physical components.

Figure 4:
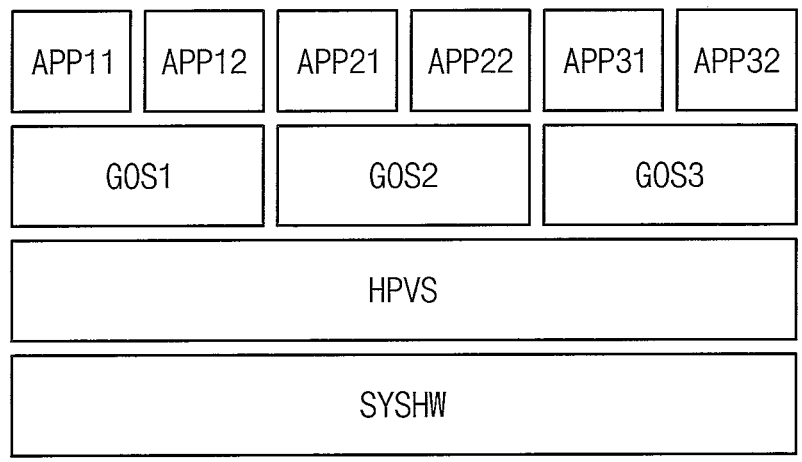
FIGS. 4, 5 and 6 are diagrams illustrating example embodiments of a hierarchical structure of a virtualization environment of a virtualized system according to example embodiments.
Figure 5:
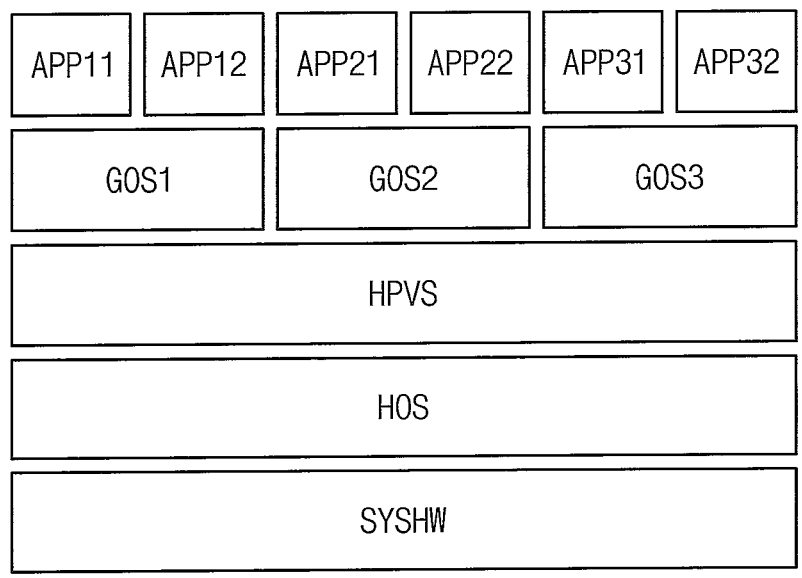
Figure 6:
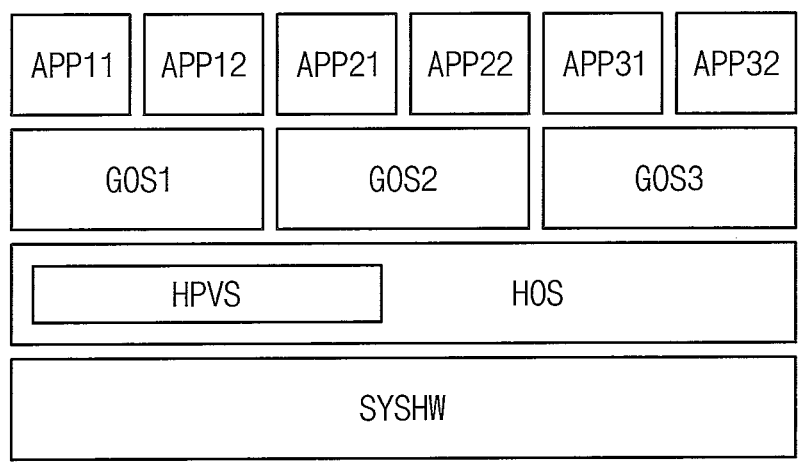

FIGS. 4, 5 and 6 are diagrams illustrating example embodiments of a hierarchical structure of a virtualization environment of a virtualized system according to example embodiments.

Referring to FIGS. 4, 5 and 6, a virtualization environment may include a plurality of guest operating systems GOS1, GOS2 and GOS3 and applications running on the plurality of guest operating systems GOS1, GOS2 and GOS3. For example, the applications APP11 and APP12 may run on the first guest operating system GOS1, the applications APP21 and APP22 may run on the second guest operating system GOS2, and the applications APP31 and APP32 may run on the third guest operating system GOS3.

The number of guest operating systems and the number of applications running on each guest operating system may be determined variously.

The hypervisor HPVS may be divided largely into a first type and a second type. FIG. 3 illustrates the hypervisor HPVS of the first type, and FIGS. 4 and 5 illustrate the hypervisors HPVS of the second type. The hypervisor HPVS of the first type may be referred to as a standalone hypervisor and the hypervisor HPVS of the second type may be referred to as a hosted hypervisor. The representative open source hypervisor includes Xen of the first type and KVM of the second type.

Referring to FIG. 4, the hypervisor HPVS of the first type may run on the system hardware SYSHW and have a full control with respect to the system hardware SYSHW. In this case, the host operating system does not exist in the virtualization hierarchical structure, and one of the guest operating systems GOS1, GOS2 and GOS3 may perform a function of the host operating system. The applications may run on the hypervisor HPVS of the first type.

The hypervisor HPVS of the second type may run on the host operating system HOS as illustrated in FIG. 5, or may be included in the host operating system HOS as illustrated in FIG. 6. In this case, the host operating system HOS has a full control with respect to the system hardware SYSHW. The host operating system HOS may run on the system hardware SYSHW and the applications may run on the host operating system HOS.

In this disclosure, example embodiments are described based on the hypervisor HPVS of the first type, but example embodiments are not limited thereto. Example embodiments may be applied to any virtualized systems including the hypervisor HPVS of the second type or other types.

Figure 7:
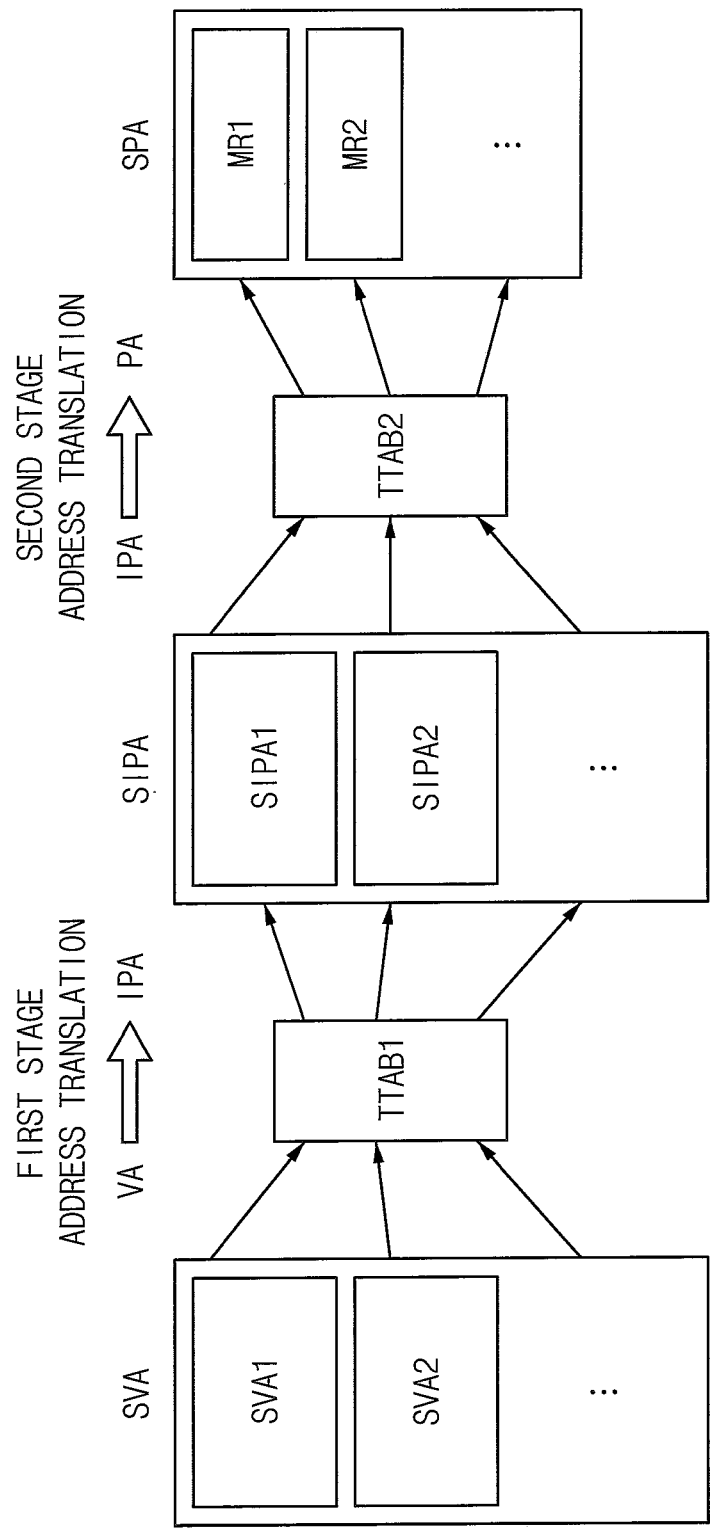
FIGS. 7 and 8 are diagrams illustrating a two-stage address translation of a virtualized system according to example embodiments.
Figure 8:
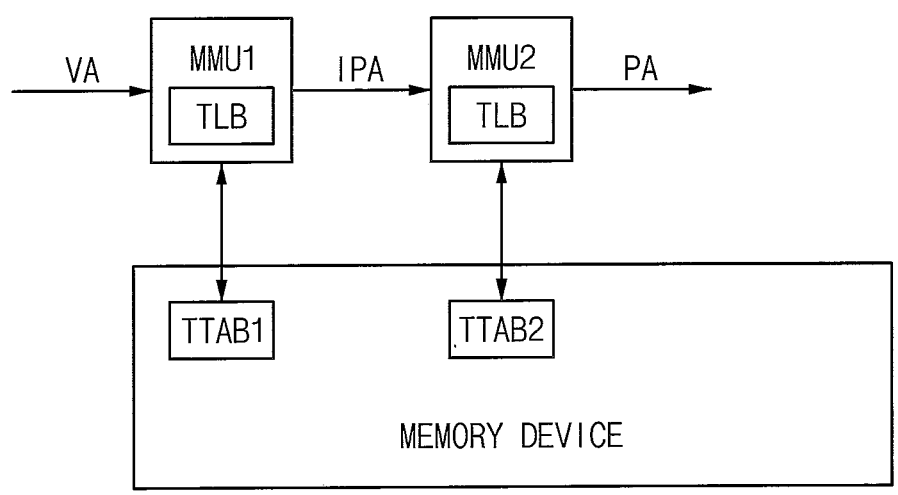

FIGS. 7 and 8 are diagrams illustrating a two-stage address translation of a virtualized system according to example embodiments.

Referring to FIGS. 7 and 8, a two-stage address translation may include a first stage address translation to convert a virtual address VA of the plurality of guest operating systems to an intermediate physical address IPA of the virtual memory devices in the virtual machines and a second stage address translation to convert the intermediate address IPA to a physical address PA of the memory device.

The virtual address VA indicates a position in a virtual address space SVA, the intermediate physical address IPA indicates a position in an intermediate address space SIPA and the physical address PA indicates a real physical position of the memory region of the memory device.

As described with reference to FIG. 3, each of the guest operating systems GOS1 and GOS2 may include the virtual memory management unit vGMMU. The virtual memory management unit vGMMU may manage mapping between the virtual address VA of guest virtual address spaces SVA1 and SVA2 respectively corresponding to the guest operating systems GOS1 and GOS2, and the intermediate physical address IPA of the guest intermediate physical address spaces SIPA1 and SIPA2 respectively corresponding to the guest operating systems GOS1 and GOS2.

The mapping information managed by the virtual memory management unit vGMMU may be stored in the first stage translation table TTAB1 and the first stage translation table TTAB1 may be referenced to access the memory device.

FIG. 7 illustrates, for convenience of illustration, that the guest virtual address spaces SVA1 and SVA2 are spatially separated and the guest intermediate physical address spaces SIPA1 and SIPA2 are spatially separated. The superposition of the address spaces may not be considered because the guest operating systems GOS1 and GOS2 run independently from each other.

In addition, as described with reference to FIG. 3, the hypervisor HPVS may include the virtual memory management unit vHMMU. The virtual memory management unit vHMMU may allocate the guest memory regions MR1 and MR2 of the memory device respectively to the guest operating systems GOS1 and GOS2. The guest memory regions MR1 and MR2 have to be allocated to be spatially separated from each other.

The first guest operating system GOS1 may access only the first guest memory region MR1 and the second guest operating system GOS2 may access only the second guest memory region MR2. For example, the first guest operating system GOS1 is not able to access the second guest memory region MR2, and the second guest operating system GOS2 is not able to access the first guest memory region MR1. As a result, the hypervisor HPVS may provide spatial isolation to prevent memory crash between the plurality of guest operating systems GOS1 and GOS2.

The virtual memory management unit vHMMU may manage mapping between the intermediate physical address IPA of the guest intermediate physical address spaces SIPA1 and SIPA2 and the physical address PA of the allocated guest memory regions MR1 and MR2.

The mapping information managed by the virtual memory management unit vHMMU may be stored in the second stage translation table TTAB2 and the second stage translation table TTAB2 may be referenced to access the memory device.

As such, the hypervisor HPVS may provide the spatial isolation between the plurality of guest operating systems GOS1 and GOS2.

In general, the hypervisor HPVS may allocate the guest memory regions adaptively by monitoring the state of memory usage by the plurality of guest operating systems GOS1 and GOS2. The direct memory access device 200 has the function to issue transaction or the direct access request for accessing the memory device even though the target guest operating system controlling the direct memory access device is rebooted. Such memory access may overwrite the memory region of the other guest operating system or read wrong data, thereby causing operation errors of the virtualized system.

As described above, according to example embodiments, the hypervisor HPVS may control the memory management circuit to block the direct access of the direct memory access device to the memory device when the target guest operating system controlling the direct memory access device is rebooted.

As the memory capacity of the memory device increases, the data amount or the size of the address mapping information is increased. Accordingly it may not be efficient to store the address mapping information in the processor. A hardware configuration, as illustrated in FIG. 8, may be implemented to enhance efficiency of address translation for access operations.

Referring to FIG. 8, the first stage translation table TTAB1 and the second stage translation table TTAB2 including the address mapping information may be stored in the memory device. The first stage translation table TTAB1 and the second stage translation table TTAB2 stored in the memory device may be referenced for address translation during the access operations.

To enhance the speed and the efficiency of the address translation, the virtualized system may include memory management units MMU1 and MMU2 implemented as hardware as illustrated in FIG. 8. The memory management units MMU1 and MMU2 may be included in the memory management circuit 300 in FIG. 1.

The first memory management unit MMU1 may perform the first stage address translation based on the address mapping information of the first stage translation table TTAB1 to convert the virtual address VA for the access operation with respect to the memory device to the intermediate physical address IPA.

The second memory management unit MMU2 may perform the second stage address translation based on the address mapping information of the second stage translation table TTAB2 to convert the intermediate physical address IPA transferred from the first memory management unit MMU1 to the physical address PA of the memory device.

The first memory management unit MMU1 and/or the second memory management unit MMU2 may include a translation look aside buffer (TLB) to further enhance the speed and the efficiency of the address translation. The TLB may store the address mapping information referenced recently and/or frequently.

Figure 9:
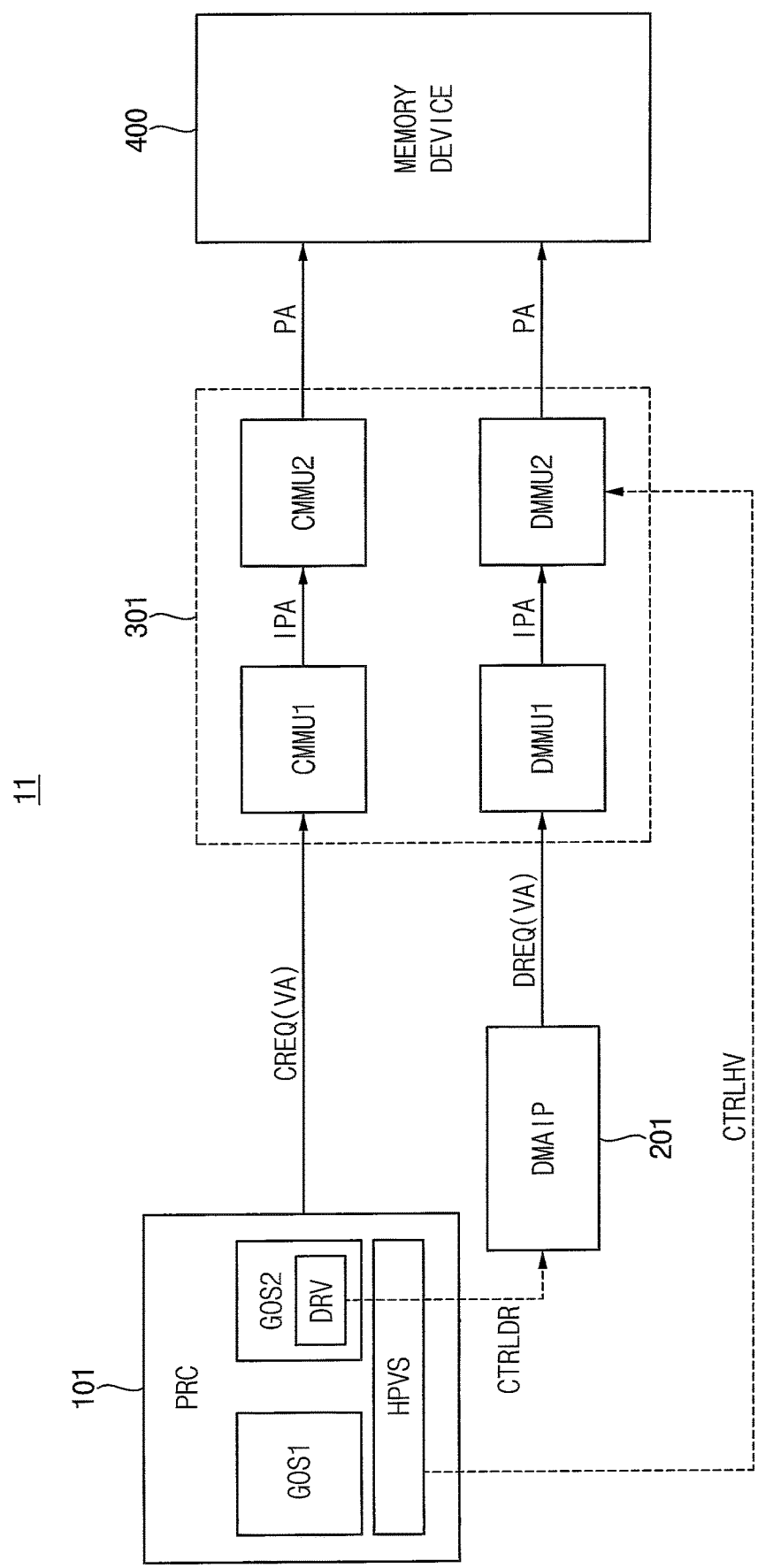
FIG. 9 is a block diagram illustrating a virtualized system according to example embodiments.

FIG. 9 is a block diagram illustrating a virtualized system according to example embodiments.

Referring to FIG. 9, a virtualized system 11 may include a processor PRC 101 (e.g., a CPU), a direct memory access device DMAIP 201, a memory management circuit 301 and a memory device 400. The virtualized system 11 of FIG. 9 is similar to the virtualized system 10 of FIG. 1, and repeated descriptions are omitted.

The memory management circuit 301 may include a first stage core memory management unit CMMU1, a second stage core memory management unit CMMU2, a first stage direct memory management unit DMMU1 and a second stage direct memory management unit DMMU2.

The first stage core memory management unit CMMU1 may perform a first stage core address translation to convert the virtual address VA of a core access request CREQ issued by the processor 101 to the intermediate physical address IPA. The second stage core memory management unit CMMU2 may perform a second stage core address translation to convert the intermediate physical address IPA transferred from the first stage core memory management unit CMMU1 to the physical address PA of the memory device 400.

The first stage direct memory management unit DMMU1 may perform a first stage direct address translation to convert the virtual address VA of a direct access request DREQ issued by the direct memory access device 201 to the intermediate physical address IPA. The second stage direct memory management unit DMMU2 may perform a second stage direct address translation to convert the intermediate physical address IPA transferred from the first stage direct memory management unit DMMU1 to the physical address PA of the memory device 400.

As such, the first stage core memory management unit CMMU1 and the first stage direct memory management unit DMMU1 of the memory management circuit 301 may perform the first stage address translation to convert the virtual address VA of the plurality of guest operating systems GOS1 and GOS2 to the intermediate physical address IPA, and the second stage core memory management unit CMMU2 and the second stage direct memory management unit DMMU2 of the memory management circuit 301 may perform the second stage address translation to convert the intermediate physical address IPA to the physical address PA of the memory device 400.

FIG. 9 illustrates an example in which the second guest operating system GOS2 corresponds to the target guest operating system. The second guest operating system GOS2 may include a device driver DRV configured to control the direct memory access device 201, and the second guest operating system GOS2 may control the direct memory access device 201 through the device driver DRV. The device driver DRV may generate control signals CTRLDR to control the direct memory access device 201. In this case, the hypervisor HPVS may control the memory management circuit 301 to block the direct access of the direct memory access device 201 to the memory device 400 when the second guest operating system GOS2 corresponding to the target guest operating system is rebooted. In some example embodiments, the hypervisor HPVS may block operations of the second stage direct memory management unit DMMU2 when the second guest operating system GOS2 is rebooted. The hypervisor HPVS may generate control signals CTRLHV to control the second stage direct memory management unit DMMU2.

As such, the memory management circuit 301 may block the direct access by blocking, among the first stage direct address translation and the second stage direct address translation, the second stage direct address translation based on control of the hypervisor HPVS when the target guest operating system, that is, the second guest operating system GOS2 is rebooted.

In contrast, the first stage core memory management unit CMMU1 and the second stage core management unit CMMU2 of the memory management circuit 301 may continue to operate normally and perform the core access regardless the status of the second guest operating system GOS2. In other words, the memory management circuit 301 may perform the core address translation to convert the virtual address VA of the core access request CREQ issued by the processor 101 to the physical address PA of the memory device 400.

Figure 10:
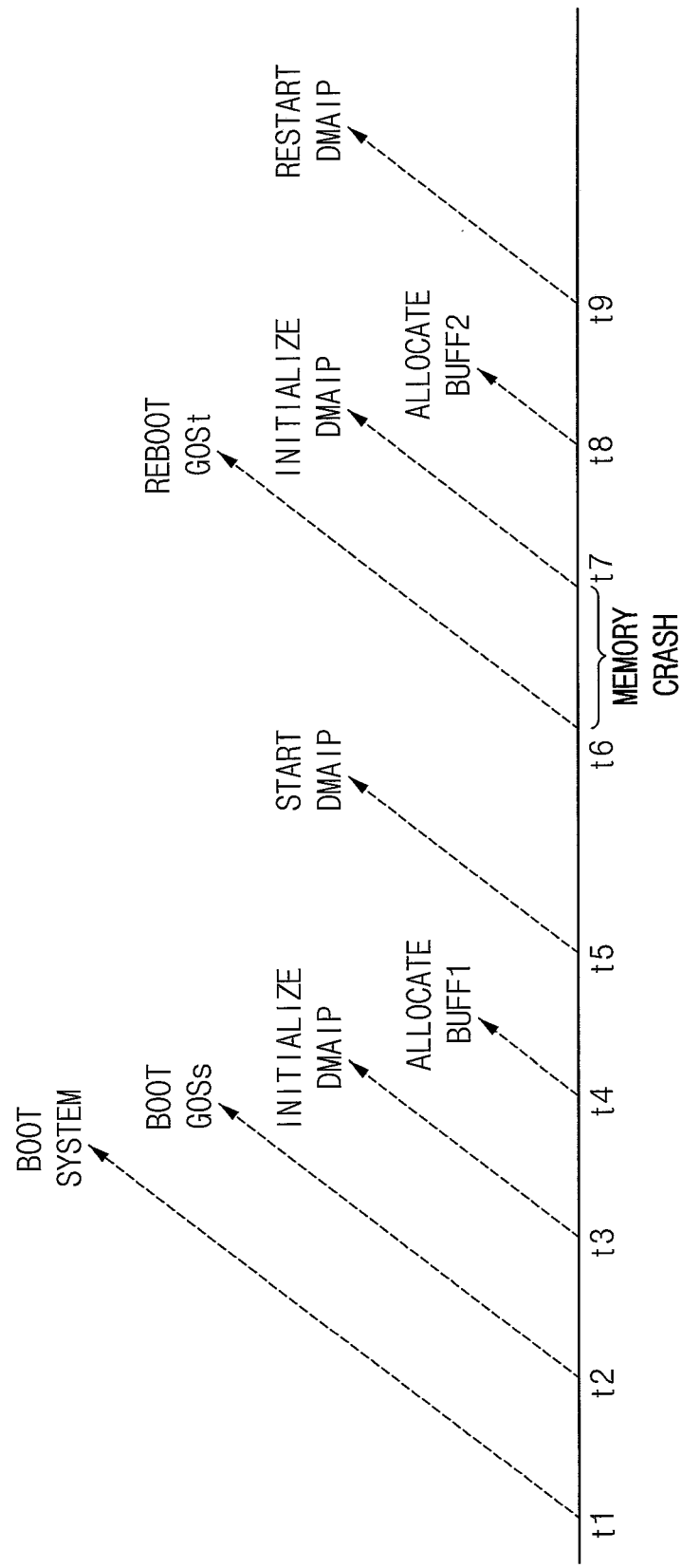
FIGS. 10 and 11 are diagrams illustrating memory crash occurring when a guest operating system is rebooted.
Figure 11:
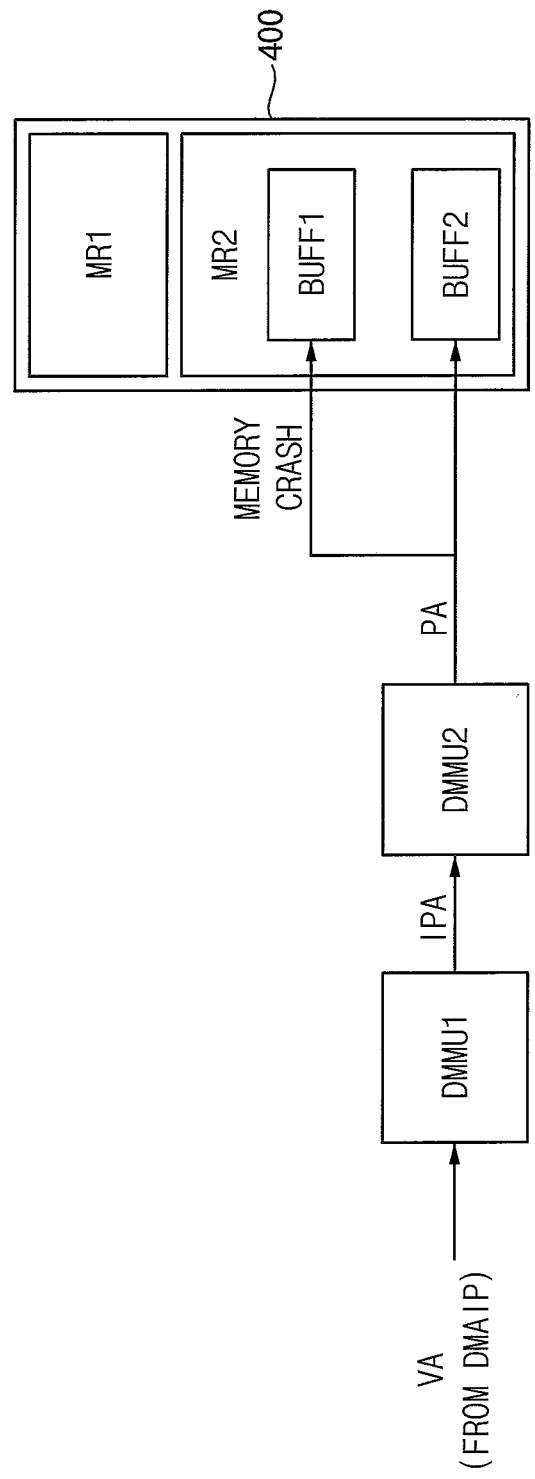

FIGS. 10 and 11 are diagrams illustrating memory crash occurring when a guest operating system is rebooted.

Referring to FIGS. 9 and 10, at time point t1, the virtualized system 11 may be booted by supplying power to the virtualized system 11. Booting of the virtualized system 11 may include storing initial setting values for the operations of the virtualized system 11 in registers included in the virtualized system 11 and loading software program codes corresponding the hypervisor HPVS to the memory device 400.

At time point t2, the hypervisor HPVS may boot the plurality of guest operating systems GOSs, for example, the hypervisor HPVS may boot the first guest operating system GOS1 and the second guest operating system GOS2. Booting of the plurality of guest operating systems GOSs may include loading software program codes corresponding to the plurality of guest operating systems GOSs to the memory device 400.

At time point t3, the second guest operating system GOS2 corresponding to the target guest operating system may initialize the direct memory access device DMAIP. Initialization of the direct memory access device DMAIP may include storing initial setting values for operations of the direct memory access device DMAIP in registers included in the direct memory access device DMAIP.

At time point t4, the second guest operating system GOS2 corresponding to the target guest operating system may allocate a first buffer region BUFF1 for the direct memory access device DMAIP in the guest memory region of the memory device 400 allocated to the second guest operating system GOS2.

At time point t5, the second guest operating system GOS2 may start operations of the direct memory access device DMAIP through the device driver DRV.

After time point t5, a sudden reset of the second guest operating system GOS2 may be triggered, for example, due to internal errors of the second guest operating system GOS2 or external factors.

At time point t6, the hypervisor HPVS may reboot the second guest operating system GOS2 corresponding to the target guest operating system.

At time point t7 when rebooting of the second guest operating system GOS2 is completed, the second guest operating system GOS2 may initialize the direct memory access device DMAIP through device driver DRV.

At time point t8, the second guest operating system GOS2 corresponding to the target guest operating system may allocate a second buffer region BUFF2 for the direct memory access device DMAIP in the guest memory region of the memory device 400 allocated to the second guest operating system GOS2.

At time point t9, the second guest operating system GOS2 may restart operations of the direct memory access device DMAIP through the device driver DRV.

As such, the second guest operating system GOS2 corresponding to the target guest operating system may allocate a new buffer region, that is the second buffer region BUFF2 for the direct memory access device DMAIP after rebooting of the second guest operating system GOS2 is completed, and the device driver DRV may restart the direct memory access device DMAIP after the second buffer region BUFF2 is allocated.

Referring to FIGS. 9, 10 and 11, the hypervisor HPVS may allocate a plurality of guest memory regions MR1 and MR2 with respect to the plurality of guest operating systems GOS1 and GOS2 in the physical address space of the memory device 400.

The first guest operating system GOS1 may only access the first guest memory region MR1, and the second guest operating system GOS2 may only access the second guest memory region MR2. For example, the first guest operating system GOS1 is not able to access the second guest memory region MR2, and the second guest operating system GOS2 is not able to access the first guest memory region MR1. As such, the hypervisor HPVS may provide spatial isolation to prevent memory crash between the plurality of guest operating systems GOS1 and GOS2.

As described above with reference to FIG. 10, the second guest operating system GOS2 corresponding to the target guest operating system may allocate the first buffer region BUFF1 in the second guest memory region MR2, allocated to the second guest operating system GOS2, at time point t4 when the original booting is completed. In addition, the second guest operating system GOS2 may allocate the new buffer region, that is, the second buffer region BUFF2 in the second guest memory region MR2 at time point t8 when rebooting of the second guest operating system GOS2 is completed.

As described above, the direct memory access device DMAIP is able to issue transaction or the direct access request for accessing the memory device 400 even though the second guest operating system GOS2 controlling the direct memory access device DMAIP is rebooted. Accordingly the direct memory access device DMAIP may access the first buffer region BUFF1 that is previously allocated, between time point t6 when the second guest operating system GOS2 is rebooted and time point t7 when the direct memory access device DMAIP is initialized. The hypervisor HPVS may allocate the guest memory regions adaptively by monitoring the memory usage state of the plurality of guest operating systems GOS1 and GOS2. Accordingly the memory crash may occur when the direct memory access device DMAIP accesses the first buffer region BUFF1 during time interval t6~t7.

Figure 12:
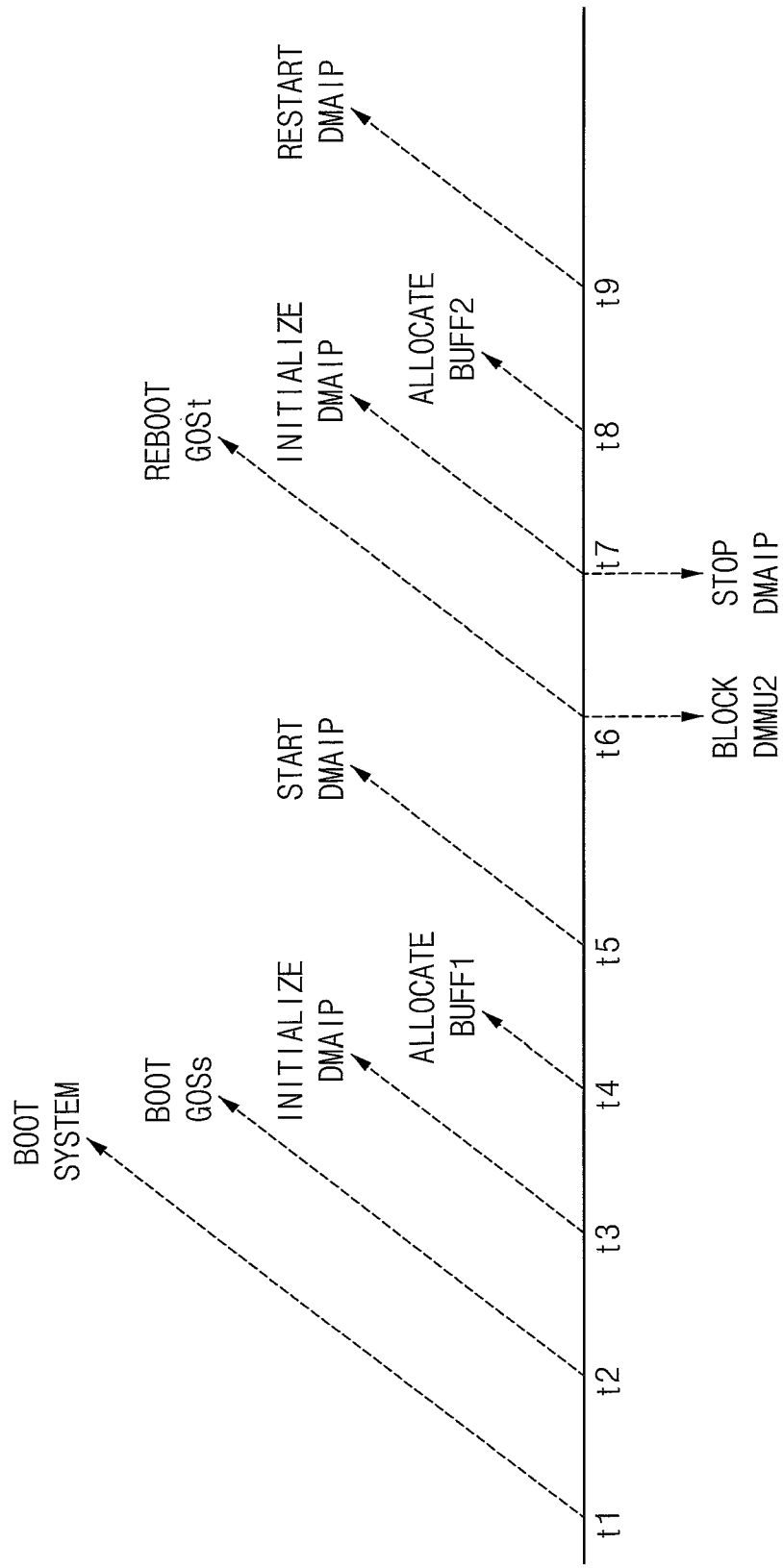
FIGS. 12 and 13 are diagrams illustrating a method of preventing memory crash of a virtualized system according to example embodiments.
Figure 13:
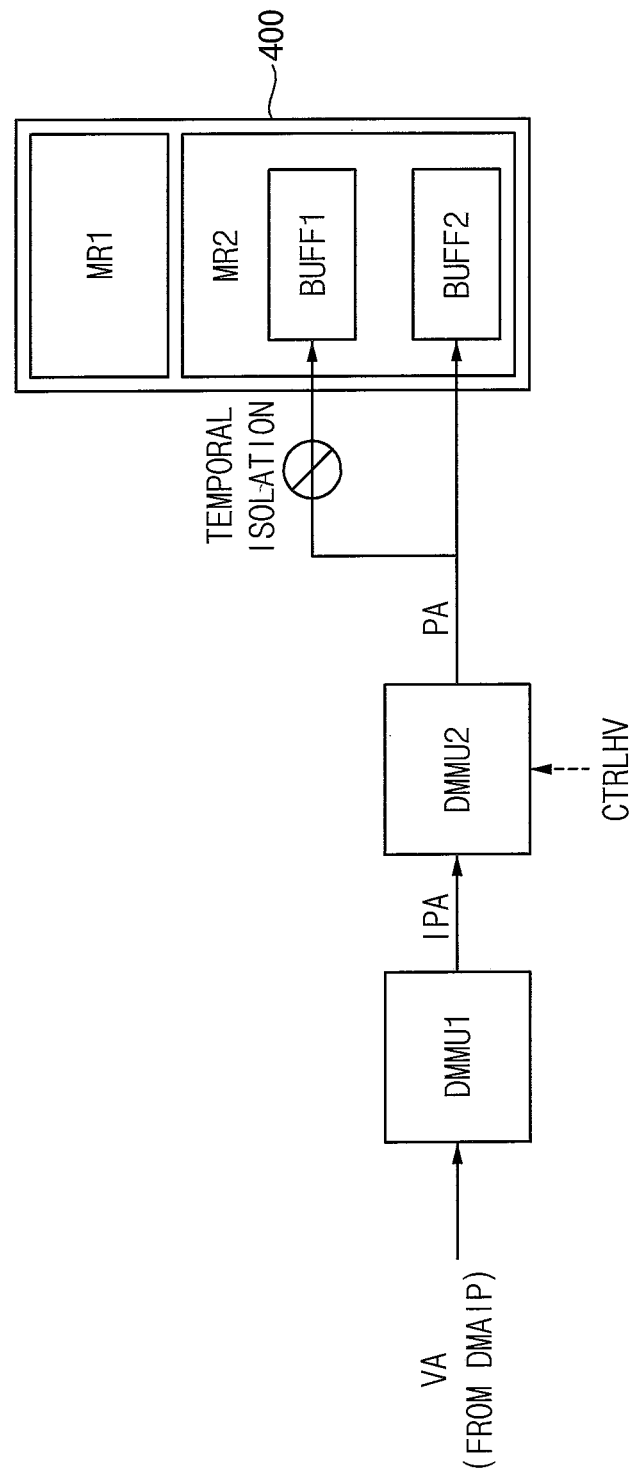

FIGS. 12 and 13 are diagrams illustrating a method of preventing memory crash of a virtualized system according to example embodiments. The descriptions repeated with FIGS. 10 and 11 may be omitted.

Referring to FIGS. 9, 12 and 13, at time point t6 when the second guest operating system GOS2 is rebooted, the hypervisor may block the operations of the second stage direct memory management unit DMMU2 as described above. In other words, the hypervisor HPVS may block the direct access by blocking the second stage direct address translation of the second stage direct memory management unit DMMU2.

At time point t7 when rebooting of the second guest operating system GOS2 is completed, the second guest operating system GOS2 may block operations of the direct memory access device DMAIP through the device driver DRV.

As a result, the direct access of the direct memory access device DMAIP to the memory device 400 may be blocked during time interval t6~t7 based on control of the hypervisor HPVS. As such, the hypervisor HPVS may provide temporal isolation of the direct memory access device DMAIP during the time interval t6~t7.

As such, the virtualized system and the method of preventing memory crash of the virtualized system according to example embodiments may rapidly block direct access and efficiently prevent memory crash by controlling the memory management circuit to provide temporal isolation of the direct memory access device DMAIP when the target guest operating system controlling the direct memory access device is rebooted.

Figure 14:
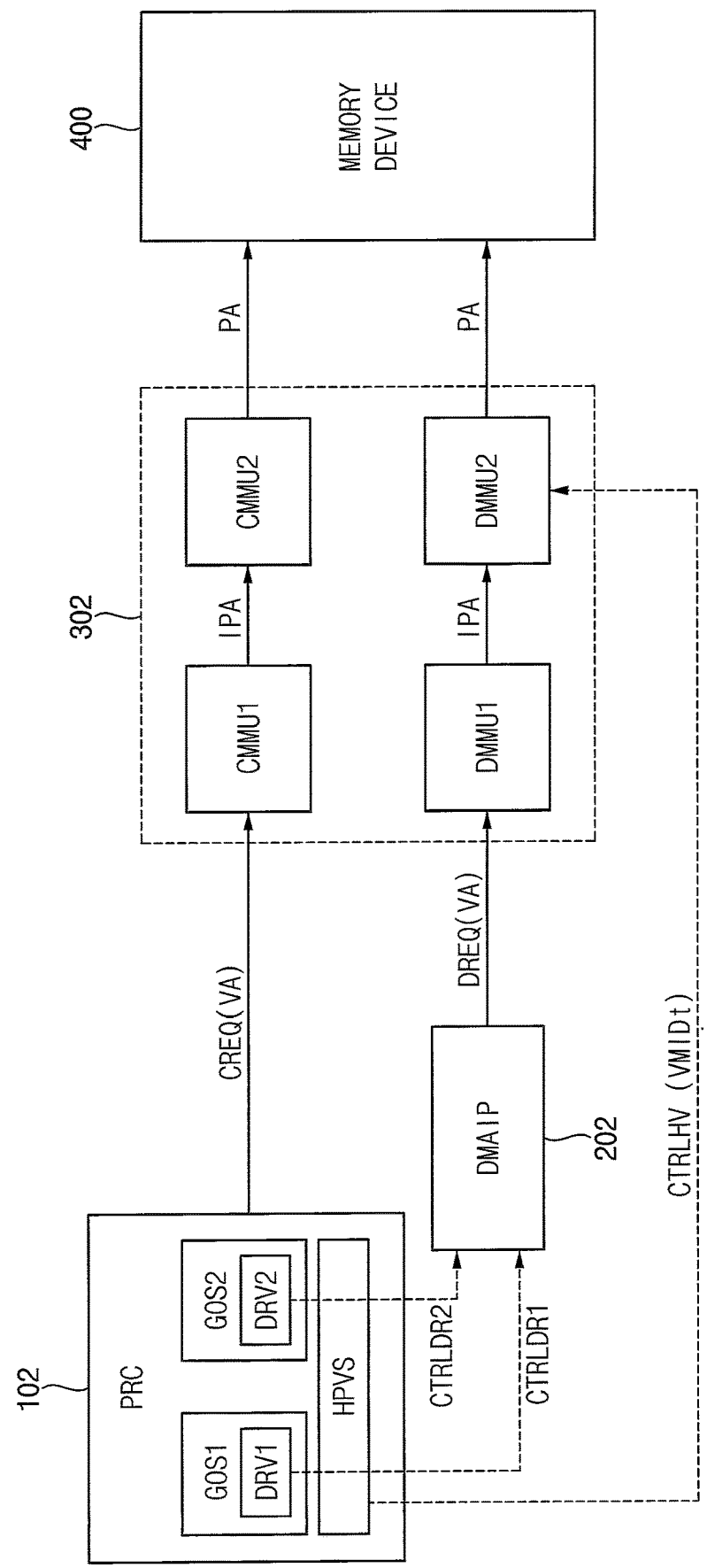
FIG. 14 is a block diagram illustrating a virtualized system according to example embodiments.

FIG. 14 is a block diagram illustrating a virtualized system according to example embodiments.

Referring to FIG. 14, a virtualized system 12 may include a processor PRC 102 (e.g., a CPU), a direct memory access device DMAIP 202, a memory management circuit 302 and a memory device 400. The virtualized system 12 of FIG. 14 is similar to the virtualized systems 10 and 11 of FIGS. 1 and 9, and repeated descriptions are omitted.

As described above, the memory management circuit 301 may include a first stage core memory management unit CMMU1, a second stage core memory management unit CMMU2, a first stage direct memory management unit DMMU1 and a second stage direct memory management unit DMMU2.

FIG. 14 illustrates an example embodiment in which a plurality of guest operating systems of a virtualized system includes a plurality of target guest operating systems respectively controlling a direct memory access device. For example, a first guest operating system GOS1 and a second guest operating system GOS2 may correspond to the target guest operating systems respectively controlling the direct memory access device 202.

The first guest operating system GOS1 may include a first device driver DRV1 and the first guest operating system GOS1 may control the direct memory access device 202 through the first device driver DRV1. The first device driver DRV1 may generate control signals CTRLDR1 to control the direct memory access device 202.

The second guest operating system GOS2 may include a second device driver DRV2 and the second guest operating system GOS2 may control the direct memory access device 202 through the second device driver DRV2. The second device driver DRV2 may generate control signals CTRLDR2 to control the direct memory access device 202.

In this case, the hypervisor HPVS may control the memory management circuit 302 to block the direct access related to one target guest operating system that is rebooted among the plurality of target guest operating systems GOS1 and GOS2 and to normally perform the direct access related to the remaining target guest operating systems except the one target guest operating system. In some example embodiments, the hypervisor HPVS may control the second stage direct memory management unit DMMU2 of the memory management circuit 302. The hypervisor HPVS may generate control signals CTRLHV to control the second stage direct memory management unit DMMU2. The control signals CTRLHV may include a virtual machine identifier VMIDt indicating the target guest operating system that is rebooted.

Figure 15:
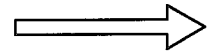
FIG. 15 is a diagram illustrating an example embodiment of blocking direct access in the virtualized system of FIG. 14.

FIG. 15 is a diagram illustrating an example embodiment of blocking direct access in the virtualized system of FIG. 14.

FIG. 15 illustrates a second stage translation table TTAB2 for the second stage direct address translation of the second stage direct memory management unit DMMU2.

Referring to FIG. 15, the second stage translation table TTAB2 may include a plurality of mapping entries MENT1~MENT5. Each mapping entry may include the intermediate physical address IPA, the physical address PA mapped to the intermediate physical address IPA, and attributes such as a virtual machine identifier VMID indicating the associated guest operating system. In FIG. 15, the value '1' of the virtual machine identifier VMID may indicate the mapping entry is associated with the first guest operating system GOS1, and the value '2' of the virtual machine identifier VMID may indicate the mapping entry is associated with the second guest operating system GOS2.

For example, as illustrated in the left portion of FIG. 15, a first mapping entry MENT1 may indicate that the intermediate physical address A5 of the first guest operating system GOS1 is mapped to the physical address Ac, a second mapping entry MENT2 may indicate that the intermediate physical address A2 of the second guest operating system GOS2 is mapped to the physical address Aa, a third mapping entry MENT3 may indicate that the intermediate physical address A3 of the first guest operating system GOS1 is mapped to the physical address Ab, a fourth mapping entry MENT4 may indicate that no physical address is mapped to the intermediate physical address A9 of the first guest operating system GOS1, and a fifth mapping entry MENT5 may indicate that the intermediate physical address A7 of the second guest operating system GOS2 is mapped to the physical address Ad.

In some example embodiments, the memory management circuit 302 may block the direct access related to one target guest operating system by invalidating mapping entries related to the one target guest operating system among mapping entries of a translation table based on control of the hypervisor HPVS when the one target guest operating system is rebooted.

As described above with reference to FIG. 14, the control signals CTRLHV provided from the hypervisor HPVS may include the virtual machine identifier VMIDt indicating the target guest operating system that is rebooted. The second stage direct memory management unit DMMU2 may invalidate the mapping entries corresponding to the virtual machine entries VMIDt. FIG. 15 illustrates an example in which the second guest operating system GOS2 is rebooted.

As illustrated in the right portion of FIG. 15, when the second guest operating system GOS2 is rebooted, the second stage direct memory management unit DMMU2 may invalidate the second mapping entry MENT2 and the fifth mapping entry MENT5 corresponding to the second guest operating system GOS2 that is rebooted.

In some example embodiments, the invalidation of the mapping entry may be performed by deleting the physical address mapped to the intermediate physical address as illustrated in FIG. 15, but example embodiments are not limited thereto. The invalidation of the mapping entry may be implemented through various methods capable of blocking the second stage direct address translation.

The second stage direct memory management unit DMMU2 may maintain, without invalidating, the first mapping entry MENT1, the third mapping entry MENT3 and the fourth mapping entry MENT4 associated with the first guest operating system GOS1 that is not rebooted.

As such, when the plurality of target guest operating systems exist and one target guest operating system is rebooted, the memory management circuit 302 may block the direct access related to the one target guest operating system by invalidating mapping entries related to the one target guest operating system among mapping entries of the translation table based on control of the hypervisor HPVS. While the one target guest operating system is rebooted, the memory management circuit 302 may normally perform the direct access related to other target guest operating systems by maintaining mapping entries related to the rest target guest operating systems among the mapping entries of the translation table.

Figure 16:
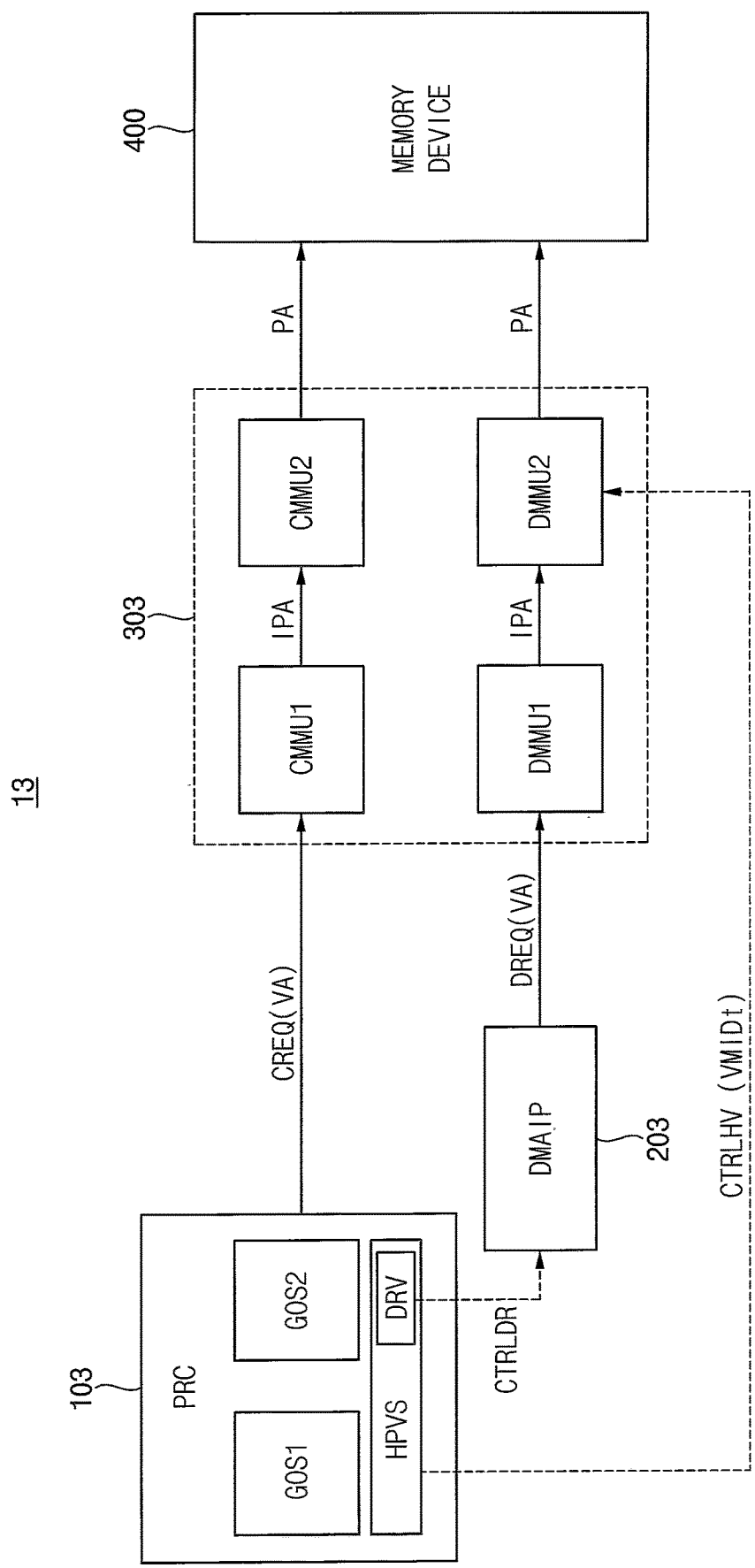
FIG. 16 is a block diagram illustrating a virtualized system according to example embodiments.

FIG. 16 is a block diagram illustrating a virtualized system according to example embodiments.

Referring to FIG. 16, a virtualized system 13 may include a processor PRC 103 (e.g., a CPU), a direct memory access device DMAIP 203, a memory management circuit 303 and a memory device 400. The virtualized system 13 of FIG. 16 is similar to the virtualized systems 10 and 11 of FIGS. 1 and 9, and repeated descriptions are omitted.

As described above, the memory management circuit 301 may include a first stage core memory management unit CMMU1, a second stage core memory management unit CMMU2, a first stage direct memory management unit DMMU1 and a second stage direct memory management unit DMMU2.

FIG. 16 illustrates an example embodiment in which the hypervisor HPVS includes a device driver DRV configured to control the direct memory access device 203. One of the first guest operating system GOS1 and the second guest operating system GOS2 may correspond to the target guest operating system controlling the direct memory access device 203, and the target guest operating system may control the direct memory access device 203 through the device driver DRV included in the hypervisor HPVS. The device driver DRV may generate control signals CTRLDR to control the direct memory access device 203.

In this case, the hypervisor HPVS may control the memory management circuit 303 to block the direct access of the direct memory access device 203 to the memory device 400 when the target guest operating system is rebooted. In some example embodiments, the hypervisor HPVS may control the second stage direct memory management unit DMMU2 of the memory management circuit 303 when the target guest operating system is rebooted. The hypervisor HPVS may generate control signals CTRLHV to control the second stage direct memory management unit DMMU2. The control signals CTRLHV may include a virtual machine identifier VMIDt indicating the target guest operating system that is rebooted.

Figure 17:
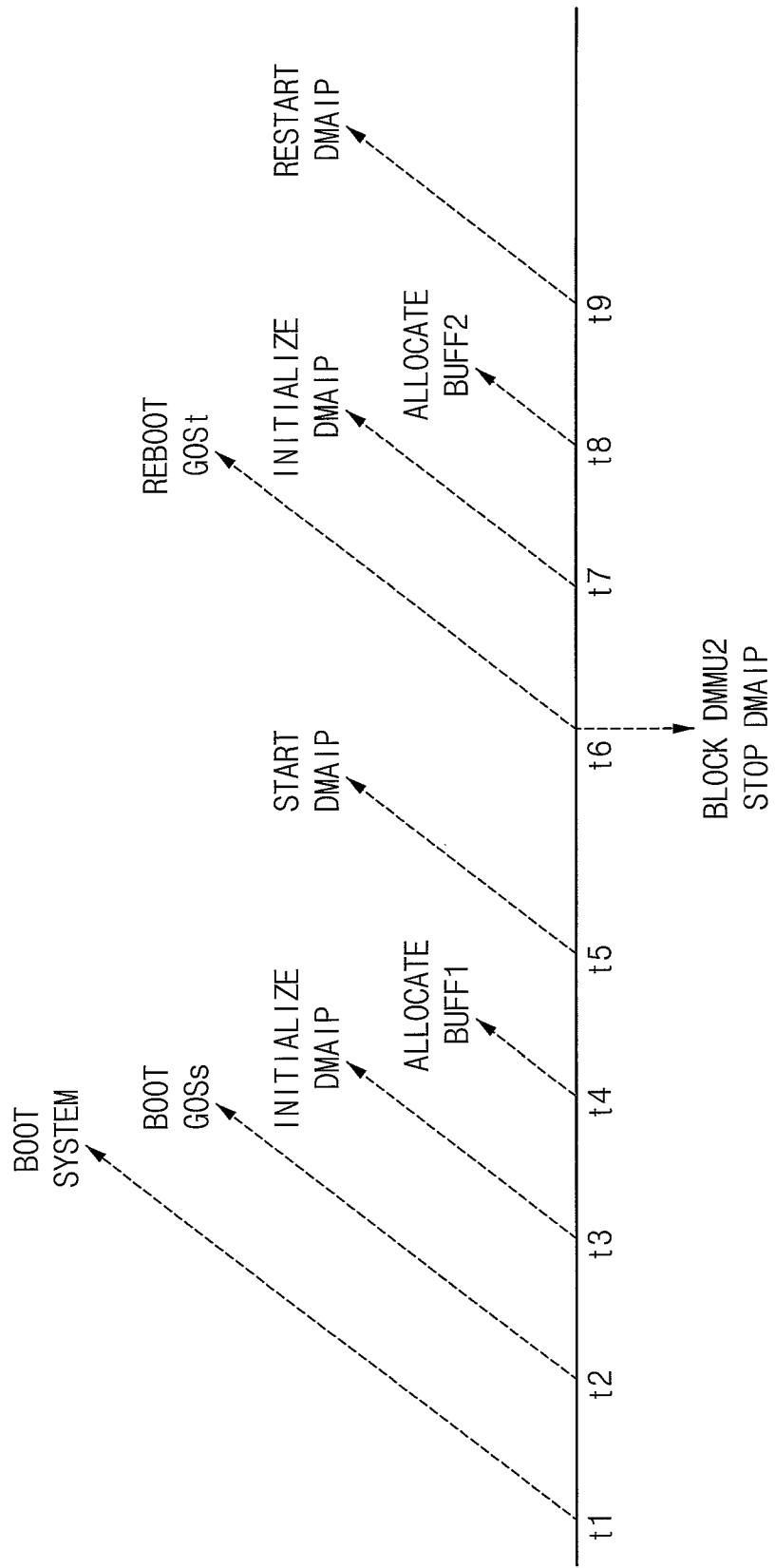
FIG. 17 is a diagram illustrating a method of preventing memory crash of the virtualized system of FIG. 16.

FIG. 17 is a diagram illustrating a method of preventing memory crash of the virtualized system of FIG. 16. The descriptions repeated with FIGS. 10 and 11 may be omitted.

Referring to FIGS. 16 and 17, at time point t6, the hypervisor may block the operations of the second stage direct memory management unit DMMU2 as described above. In other words, the hypervisor HPVS may block the direct access by blocking the second stage direct address translation of the second stage direct memory management unit DMMU2.

In addition, the hypervisor may block operation of the direct memory access device 203 through the device driver DRV at time point t6 before rebooting of the target guest operating system is completed.

As a result, the direct access of the direct memory access device DMAIP to the memory device 400 may be blocked during time interval t6~t7 based on control of the hypervisor HPVS. As such, the hypervisor HPVS may provide temporal isolation of the direct memory access device DMAIP during the time interval t6~t7.

As such, the virtualized system and the method of preventing memory crash of the virtualized system according to example embodiments may rapidly block direct access and efficiently prevent memory crash by controlling the memory management circuit to provide temporal isolation of the direct memory access device DMAIP when the target guest operating system controlling the direct memory access device is rebooted.

Figure 18:
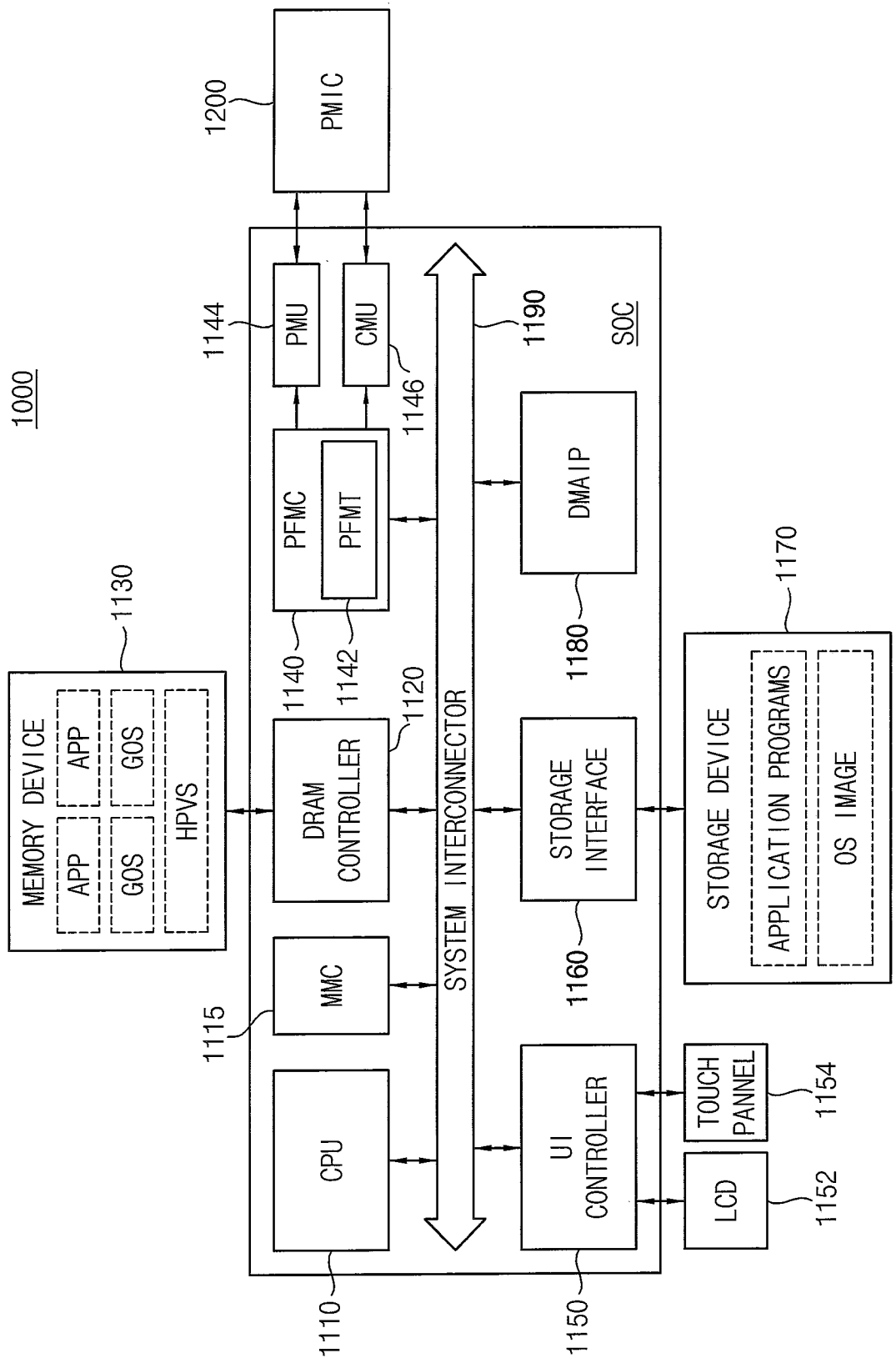
FIG. 18 is a block diagram illustrating a virtualized system according to example embodiments.

FIG. 18 is a block diagram illustrating a virtualized system according to example embodiments.

Referring to FIG. 18, a virtualized system 1000 may include a system on chip (SoC), a working memory 1130, a display device (LCD) 1152, a touch panel 1154, a storage device 1170, a power management integrated circuit (PMIC) 1200, etc. The SoC may include a central processing unit (CPU) 1110, a memory management circuit MMC 1115, a DRAM controller 1120, a performance controller 1140, a user interface controller (UI controller) 1150, a storage interface 1160, and a direct memory access device DMAIP 1180 having a function of direct memory access, a power management unit (PMU) 1144, a clock management unit (CMU) 1146, etc. It will be understood that components of the virtualized system 1000 are not limited to the components shown in FIG. 18. For example, the virtualized system 1000 may further include a hardware codec for processing image data, a security block, and the like.

The processor 1110 executes software (for example, an application program, an operating system (OS), and device drivers) for the virtualized system 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The DRAM controller 1120 provides interfacing between the working memory 1130 and the system-on-chip (SoC). The DRAM controller 1120 may access the working memory 1130 according to a request of the processor 1110 or another intellectual property (IP) block.

The memory management circuit 1115 may manage the core access of the processor 1110 to the working memory 1130 and the direct access of the direct memory access device 1180 to the working memory 1130.

The operating system (OS) or basic application programs may be loaded into the working memory 1130 during a booting operation. For example, a hypervisor HPVS and a plurality of guest operating systems GOSs stored in the storage device 1170 may be loaded into the working memory 1130 based on a booting sequence during booting of the virtualized system 1000. After that, applications APPs corresponding to the plurality of guest operating systems GOSs may be loaded in the working memory 1130.

The performance controller 1140 may adjust operation parameters of the system-on-chip (SoC) according to a control request provided from the kernel of the operating system (OS). For example, the performance controller 1140 may adjust the level of DVFS to enhance performance of the system-on-chip (SoC).

The user interface controller 1150 controls user input and output from user interface devices. For example, the user interface controller 1150 may display a keyboard screen for inputting data to the LCD 1152 according to the control of the processor 1110. Alternatively, the user interface controller 1150 may control the LCD 1152 to display data that a user requests. The user interface controller 1150 may decode data provided from user input means, such as a touch panel 1154, into user input data.

The storage interface 1160 accesses the storage device 1170 according to a request of the processor 1110. For example, the storage interface 1160 provides interfacing between the system-on-chip (SoC) and the storage device 1170. For example, data processed by the processor 1110 is stored in the storage device 1170 through the storage interface 1160. Alternatively, data stored in the storage device 1170 may be provided to the processor 1110 through the storage interface 1160.

The storage device 1170 is provided as a storage medium of the virtualized system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The direct memory access device 1180 may be provided as a separate intellectual property (IP) component to increase processing speed of a multimedia or multimedia data. For example, the direct memory access device 1180 may be provided as an intellectual property (IP) component to enhance processing performance of a text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

According to example embodiments, the hypervisor HPVS may control the memory management circuit 1115 to block the direct access of the direct memory access device 1180 to the working memory 1130 when the target guest operating system controlling the direct memory access device 1180 is rebooted.

Figure 19:
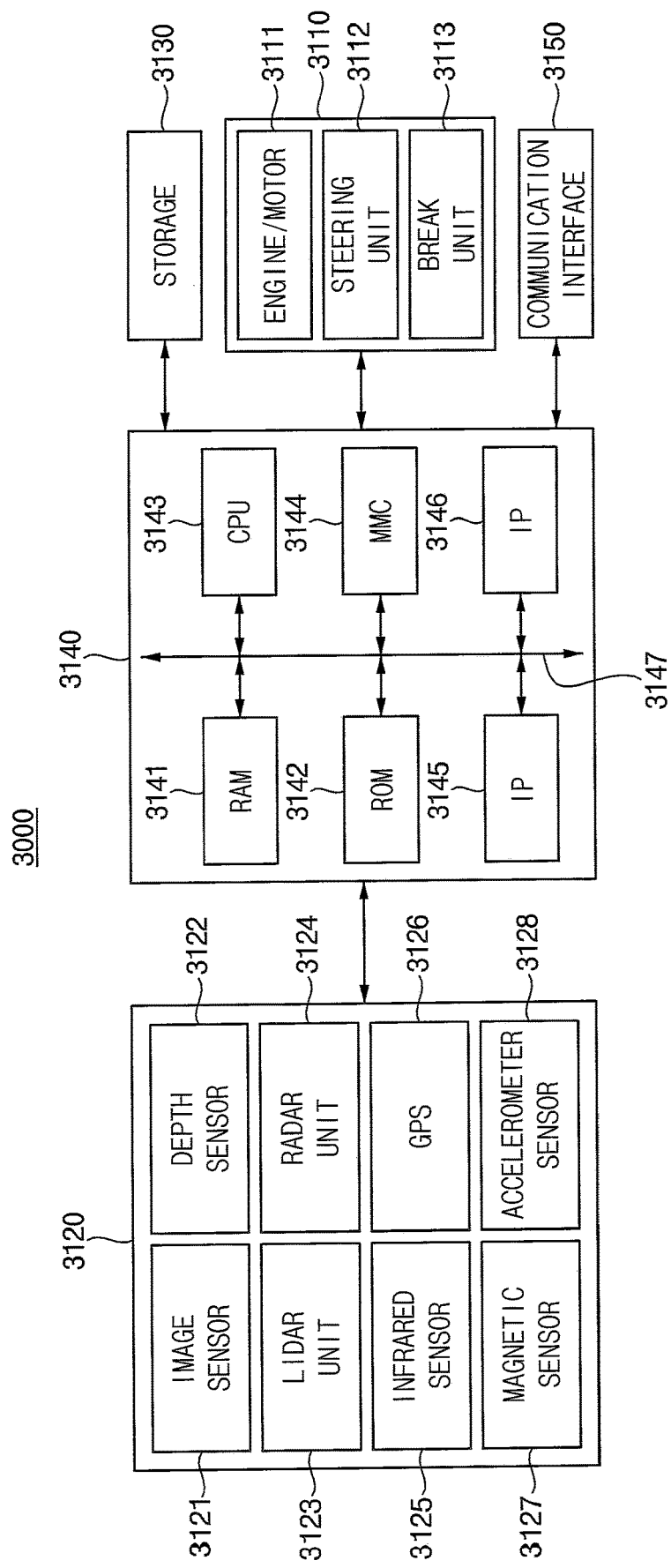
FIG. 19 is a block diagram illustrating an autonomous driving device according to example embodiments.

FIG. 19 is a block diagram illustrating an autonomous driving device according to example embodiments.

Referring to FIG. 19, an autonomous driving device 3000 may include a driver (e.g., including circuitry) 3110, a sensor 3120, a storage 3130, a controller (e.g., including processing circuitry) 3140, and a communication interface 3150.

The driver 3110 may, for example, be a configuration for driving the autonomous driving device 3000 and may include various circuitry. In a case that the autonomous driving device 3000 is implemented as a vehicle, the driver 3110 may include various circuitry and/or components, such as, for example, an engine/motor 3111, a steering unit 3112, a brake unit 3113 and the like.

The engine/motor 3111 may include any combination of an internal combustion engine, an electric motor, a steam locomotive, and a stirling engine. For example, in a case that the autonomous driving device 3000 is a gas-electric hybrid car, the engine/motor 3111 may be a gasoline engine and an electric motor. For example, the engine/motor 3111 may be configured to supply energy for the autonomous driving device 3000 to drive on a predetermined driving route.

The steering unit 3112 may be any combination of mechanisms included to control a direction of the autonomous driving device 3000. For example, when an obstacle is recognized while the autonomous driving device 3000 is driving, the steering unit 3112 may change the direction of the autonomous driving device 3000. In a case that the autonomous driving device 3000 is a vehicle, the steering unit 3112 may be configured to turn the steering wheel clockwise or counterclockwise, and change the direction of travel for the autonomous driving device 3000 accordingly.

The brake unit 3113 may be any combination of mechanisms included to decelerate the autonomous driving device 3000. For example, the brake unit may use friction or induction to reduce a speed of wheels/tires. When an obstacle is recognized while the autonomous driving device 3000 is driving, the brake unit 3113 may be configured to decelerate or slow the autonomous driving device 3000.

The driver 3110 may be an autonomous driving device 3000 driving or traveling on the ground, but example embodiments are not limited thereto. The driver 3110 may include a flight propulsion unit, a propeller, wings, etc., and may include a variety of vessel propulsion devices in accordance with various embodiments of the inventive concept.

The sensor 3120 may include a number of sensors configured to sense information relating to a surrounding environment of the autonomous driving device 3000. For example, the sensor 3120 may include at least one of an image sensor 3121, a depth camera 3122, a LIDAR unit 3123, a RADAR unit 3124, an infrared sensor 3125, a Global Positioning System (GPS) 3126, a magnetic sensor 3127, and/or an accelerometer sensor 3128.

The image sensor 3121 may be configured to capture an image of or other data related to an external object located outside of the autonomous driving device 3000. The captured image or other data related to the external device may be used as data for changing at least one of a velocity and direction of the autonomous driving device 3000. The image sensor 3121 may include a sensor of various types, such as a charge coupled device (CCD) and a complementary metal oxide semiconductor (CMOS). In addition, the depth camera 3122 may acquire a depth for determining a distance between the autonomous driving device 3000 and an external object.

The LIDAR unit 3123, the RADAR unit 3124, and the infrared sensor 3125 may each include a sensor configured to output a particular signal and sense external objects in an environment in which the autonomous driving device 3000 is located. For example, the LIDAR unit 3123 may include a laser light source and/or laser scanner configured to radiate a laser, and a detector configured to detect reflection of the laser. The RADAR unit 3124 may be a sensor configured to sense objects in the environment in which the autonomous driving device 3000 is located, using a wireless signal. In addition, the RADAR unit 3124 may be configured to sense speeds and/or directions of the objects. The infrared sensor 3125 may be a sensor configured to sense external objects in an environment in which the autonomous driving device 3000 is located using a light of a wavelength of an infrared area.

The GPS 3126, the magnetic sensor 3127, and the accelerometer sensor 3128 may each include a sensor configured to acquire information relating to a velocity, direction, location, etc., of the autonomous driving device 3000. For example, information relating to a current state of the autonomous driving device 3000 may be acquired and a possibility of collision with an external object, etc., may be identified and/or estimated. The GPS 3126 may be configured to identify a location of the autonomous driving device 3000 as a latitude, longitude and altitude data through signals communicated with a satellite, and the magnetic sensor 3127 and the accelerometer sensor 3128 may be configured to identify the current state of the autonomous driving device 3000 according to momentum, acceleration and orientation of the autonomous driving device 3000.

The storage 3130 may be configured to store data necessary for the controller 3140 to execute various processing. For example, the storage 3130 may be realized as an internal memory such as ROM, RAM and the like included in the controller 3140, and may be realized as a separate memory from the controller 3140. In this case, the storage 3130 may be realized in the form of a memory embedded in the autonomous driving device 3000, or may be realized in the form of a memory that may be detachable from the autonomous driving device 3000 according to the usage of data storage. For example, data for driving the autonomous driving device 3000 is stored in a memory embedded in the autonomous driving device 3000, and data for an extension function of the autonomous driving device 3000 may be stored in a memory that may be detached from the autonomous driving device 3000. The memory embedded in the autonomous driving device 3000 may be realized in the form of a non-volatile memory, volatile memory, flash memory, hard disk drive (HDD), solid state drive (SDD), or the like, and the memory that may be detached from the autonomous driving device 3000 may be realized in the form of a memory card (e.g., micro SD card, USB memory), an external memory that is connectable to a USB port (e.g. USB memory), and the like.

The communication interface 3150 may include various communication circuitry and may be configured to facilitate communication between the autonomous driving device 3000 and an external device. For example, the communication interface 3150 may transmit and receive driving information of the autonomous driving device 3000 to and from the external device. For example, the communication interface 3150 may be configured to perform communication through various communication methods such as an Infrared (IR) communication, a Wireless Fidelity (WI-FI), Bluetooth, Zigbee, Beacon, near field communication (NFC), WAN, Ethernet, IEEE 1394, HDMI, USB, MHL, AES/EBU, Optical, Coaxial, and the like. In some embodiments, the communication interface 3150 may be configured to communicate driving information through a server.

The controller 3140 may include a random access memory (RAM) 3141, a read only memory (ROM) 3142, a central processing unit (CPU) 3143, a memory management circuit (MMC) 4144, a plurality of intellectual properties (IPs) 3145 and 3146 and a bus 3147. The RAM 3141, the ROM 3142, the CPU 143 and the CONV 3144 may be connected to each other through the bus 3147. The controller 3140 may be realized as a system on chip (SoC).

The RAM 3141 may be a memory for reading, from the storage 3130, various instructions, etc., related to driving of the autonomous driving device 3000. The ROM 3142 may store a set of instructions for system booting. In response to a turn on command being input to the autonomous driving device 3000 and power being supplied, the CPU 3143 may copy an O/S stored in the storage 3130 into the RAM 3141 according to a command stored in the ROM 3142, and boot the system by executing the 0/S. If booting is completed, the CPU 3143 performs various operations by copying various types of application programs stored in the storage 3130 into the RAM 3141 and executing the application programs copied into the RAM 3141. The controller 3140 may perform various operations using a module stored in the storage 3130.

At least one of the IPs 3145 and 3146 may be a direct memory access device having a function of direct memory access. The memory management circuit 3144 may manage the core access of the CPU 3143 to the RAM 3141 and the direct access of the direct memory access device to the RAM 3141.

According to example embodiments, the CPU 3143 may provide a virtualization environment including a hypervisor and a plurality of guest operating systems. The hypervisor may control the memory management circuit 3144 to block the direct access when a target guest operating system controlling direct memory access device among the plurality of guest operating systems is rebooted.

As described above, the virtualized system and the method of preventing memory crash of the virtualized system according to example embodiments may rapidly block direct access and efficiently prevent memory crash by controlling the memory management circuit to provide temporal isolation of a direct memory access device when the target guest operating system controlling the direct memory access device is rebooted.

As will be appreciated by one skilled in the art, example embodiments may be implemented as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus.

The computer readable medium may be non-transitory. The computer readable medium may be a computer readable signal medium or a computer readable storage medium. The computer readable storage medium may be any tangible medium that can contain, or store a program for use by or in connection with an instruction execution system, apparatus, or device.

The example embodiments may be applied to any electronic devices and systems to which a virtualization environment is applied. For example, example embodiments may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, a cloud system, an automotive driving system, etc.

At least one of the components, elements, modules or units (collectively "components" in this paragraph) represented by a block in the drawings may be embodied as various numbers of hardware, software and/or firmware structures that execute respective functions described above, according to an example embodiment. These components may include, for example, the processor 100, the processor 101, the processor 102, the processor 103, the direct memory access device 200, the direct memory access device 201, the direct memory access device 203, the direct memory access device 203, the memory management circuit 300, the memory management circuit 301, the memory management circuit 302, the memory management circuit 303, the memory device 400, the central processing unit CPU, the memory device MEM, the storage device STR, the memory management circuit MMC, the intellectual properties IPs, and the memory management units MMU1 and MMU2, shown in FIGS. 1, 3, 8, 9, 11, 13, 14, 16, 18 and 19, not being limited thereto. At least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. For example, an IP unit may include blocks of circuitry performing specific functions, and may have a design that includes a trade secret.

It will be also understood that, although in example embodiments related to methods or flowcharts, a step or operation is described later than another step or operation, the step or operation may be performed earlier than the other step or operation unless the other step or operation is described as being performed after the step or operation.

While example embodiments have been described with reference to the accompanying drawings, it will be apparent to those skilled in the art that modifications and variations could be made without departing from the scope of the present disclosure.

What is claimed is:

1. A virtualized system comprising:
a memory device;
a processor configured to provide a virtualization environment; and
a memory management unit configured to manage a core access of the processor to the memory device and a direct access of a direct memory access device to the memory device,
wherein the processor is further configured to provide:
a plurality of guest operating systems that run independently from each other on a plurality of virtual machines of the virtualization environment; and
a hypervisor configured to control the plurality of virtual machines in the virtualization environment and control the memory management unit to block the direct access when a target guest operating system controlling the direct memory access device, among the plurality of guest operating systems is rebooted.

2. The virtualized system of claim 1, wherein the memory management unit is further configured to:
perform direct address translation by converting a virtual address of a direct access request issued by the direct memory access device to a physical address of the memory device; and
block the direct address translation to block the direct access based on control signals provided by the hypervisor when the target guest operating system is rebooted.

3. The virtualized system of claim 1, wherein the memory management unit is further configured to perform a core address translation to convert a virtual address of a core access request issued by the processor to a physical address of the memory device while the direct access is blocked.

4. The virtualized system of claim 1, wherein the memory management unit is further configured to block the direct access by invalidating mapping entries related to the target guest operating system, among mapping entries of a translation table, based on control signals provided by the hypervisor when the target guest operating system is rebooted.

5. The virtualized system of claim 1, wherein the memory management unit is further configured to perform a first stage address translation to convert a virtual address of the plurality of guest operating systems to an intermediate physical address and a second stage address translation to convert the intermediate physical address to a physical address of the memory device.

6. The virtualized system of claim 5, wherein the plurality of guest operating systems are configured to control the first stage address translation and the hypervisor is configured to control the second stage address translation.

7. The virtualized system of claim 5, wherein the memory management unit is further configured to block the direct access by blocking, among a first stage direct address translation and a second stage direct address translation, the second stage direct address translation based on control signals provided by the hypervisor when the target guest operating system is rebooted, where the first stage direct address translation is to convert the virtual address of a direct access request issued by the direct memory access device to the intermediate physical address and the second stage direct address translation is to convert the intermediate physical address to the physical address of the memory device.

8. The virtualized system of claim 7, wherein the memory management unit is further configured to:
perform the first stage direct address translation based on a first stage translation table;
perform the second stage direct address translation based on a second stage translation table; and
block the direct access by invalidating mapping entries related to the target guest operating system, among mapping entries of the second stage translation table, based on the control signals provided by the hypervisor when the target guest operating system is rebooted.

9. The virtualized system of claim 5, wherein the memory management unit comprises:
a first stage core memory manager configured to perform a first stage core address translation to convert the virtual address of a core access request issued by the processor to the intermediate physical address;
a second stage core memory manager configured to perform a second stage core address translation to convert the intermediate physical address transferred from the first stage core memory manager to the physical address of the memory device;
a first stage direct memory manager configured to perform a first stage direct address translation to convert the virtual address of a direct access request issued by the direct memory access device to the intermediate physical address; and
a second stage direct memory manager configured to perform a second stage direct address translation to convert the intermediate physical address transferred from the first stage direct memory manager to the physical address of the memory device.

10. The virtualized system of claim 9, wherein the hypervisor is further configured to control the second stage direct memory manager to block the second stage direct address translation to block the direct access when the target guest operating system is rebooted.

11. The virtualized system of claim 1, wherein the target guest operating system comprises a device driver configured to control the direct memory access device, and the device driver is configured to initialize the direct memory access device after rebooting of the target guest operating system is completed.

12. The virtualized system of claim 11, wherein the target guest operating system is configured to allocate a new buffer region with respect to the direct memory access device in a physical address space of the memory device after rebooting of the target guest operating system is completed, and
wherein the device driver is further configured to restart the direct memory access device after the new buffer region is allocated.

13. The virtualized system of claim 1, wherein the hypervisor comprises a device driver configured to control the direct memory access device, and
wherein the hypervisor is further configured to block operation of the direct memory access device through the device driver while the target guest operating system is rebooting.

14. The virtualized system of claim 1, wherein the plurality of guest operating systems comprises a plurality of target guest operating systems respectively, each of which is configured to respectively control the direct memory access device.

15. The virtualized system of claim 14, wherein the hypervisor is further configured to control the memory management unit to block the direct access of one target guest operating system that is rebooting, among the plurality of target guest operating systems, and to normally perform the direct access of remaining target guest operating systems other than the one target guest operating system.

16. The virtualized system of claim 15, wherein the memory management unit is further configured to invalidate mapping entries related to the one target guest operating system among mapping entries of a translation table based on control signals provided by the hypervisor to block the direct access related to the one target guest operating system when the one target guest operating system is rebooted.

17. The virtualized system of claim 16, wherein the memory management unit is further configured to normally perform the direct access related to the remaining target guest operating systems by maintaining mapping entries related to the remaining target guest operating systems among the mapping entries of the translation table.

18. The virtualized system of claim 1, wherein the hypervisor is further configured to allocate a plurality of guest memory regions with respect to the plurality of guest operating systems in a physical address space of the memory device, and
wherein the target guest operating system is configured to allocate a buffer region with respect to the direct memory access device in one of the plurality of guest memory regions with respect to the target guest operating system.

19. A method of preventing memory crash of a virtualized system, the method comprising:
monitoring a plurality of guest operating systems;
rebooting a target guest operating system controlling a direct memory access device, among the plurality of guest operating systems, based on a monitoring result of the monitoring;
controlling a hypervisor to provide control signals when the target guest operating system is rebooted; and
controlling a memory management unit to block the direct memory access device from directly accessing a memory device based on the control signals.

20. A virtualized system comprising:
a memory device;
a processor configured to provide a virtualization environment; and
a memory management unit comprising a core memory management unit and a direct memory management unit, wherein the core memory management unit is configured to manage a core access of the processor to the memory device and the direct memory management unit is configured to manage a direct access of a direct memory access device to the memory device,
wherein the processor is further configured to provide:
a plurality of guest operating systems that run independently from each other on a plurality of virtual machines of the virtualization environment; and
a hypervisor configured to control the plurality of virtual machines in the virtualization environment,
wherein each of the core memory management unit and the direct memory management unit is configured to perform a first stage address translation to convert a virtual address of the plurality of guest operating systems to an intermediate physical address and a second stage address translation to convert the intermediate physical address to a physical address of the memory device, and wherein the hypervisor is configured to control the memory management unit to block the second stage address translation of the direct memory management unit when a target guest operating system controlling the direct memory access device among the plurality of guest operating systems is rebooted.

* * * * *